US012551354B2

United States Patent
Kowalski

(10) Patent No.: US 12,551,354 B2
(45) Date of Patent: Feb. 17, 2026

(54) SACROILIAC JOINT FUSION IMPLANTS

(71) Applicant: GLOBUS MEDICAL, INC., Audubon, PA (US)

(72) Inventor: Matthew Kowalski, Eagleville, PA (US)

(73) Assignee: Globus Medical, Inc., Audubon, PA (US)

(*) Notice: Subject to any disclaimer, the term of this patent is extended or adjusted under 35 U.S.C. 154(b) by 53 days.

(21) Appl. No.: 18/444,861

(22) Filed: Feb. 19, 2024

(65) Prior Publication Data
US 2025/0262063 A1    Aug. 21, 2025

(51) Int. Cl.
*A61F 2/44* (2006.01)
*A61F 2/30* (2006.01)

(52) U.S. Cl.
CPC .......... *A61F 2/447* (2013.01); *A61F 2/30771* (2013.01); *A61F 2/30942* (2013.01); *A61F 2002/30156* (2013.01); *A61F 2002/30304* (2013.01); *A61F 2002/30383* (2013.01); *A61F 2002/30393* (2013.01); *A61F 2002/30476* (2013.01); *A61F 2002/30604* (2013.01); *A61F 2002/30845* (2013.01); *A61F 2002/3092* (2013.01); *A61F 2002/3093* (2013.01)

(58) Field of Classification Search
CPC .. A61F 2/447; A61F 2/30771; A61F 2/30942; A61F 2002/30156; A61F 2002/3092; A61F 2002/3093
See application file for complete search history.

(56) References Cited

U.S. PATENT DOCUMENTS

| 2016/0038301 | A1* | 2/2016 | Wickham | A61F 2/4455 623/17.16 |
|---|---|---|---|---|
| 2016/0081810 | A1* | 3/2016 | Reiley | A61B 17/1757 623/17.11 |
| 2018/0228621 | A1* | 8/2018 | Reiley | A61B 17/866 |
| 2021/0205091 | A1* | 7/2021 | Hyeon | A61F 2/447 |
| 2021/0228360 | A1* | 7/2021 | Hunt | A61F 2/44 |
| 2022/0296386 | A1* | 9/2022 | Fang | B33Y 80/00 |

* cited by examiner

*Primary Examiner* — Jacqueline T Johanas
*Assistant Examiner* — Christina Negrellirodriguez

(57) ABSTRACT

Bone implants, assemblies, and methods thereof. The implants may include non-threaded triangular implants configured to promote fixation and fusion of the sacroiliac joint. The implants may have a triangular body configured to prevent or minimize rotational motion of the implant. The implants may include an inner core or an outer shell, which provides structural support for a lattice structure. The structural geometry may be generated through topology optimization software, such as finite element analysis, based on anatomical loading conditions for the implant.

18 Claims, 23 Drawing Sheets

SACROILIAC JOINT FUSION IMPLANTS

FIELD OF THE INVENTION

The present disclosure relates to surgical devices, and more particularly, to implants and methods for fusing a sacroiliac joint.

BACKGROUND OF THE INVENTION

The sacroiliac joint (SI joint or SIJ) is the joint between the sacrum and the ilium bones of the pelvis. Limiting the rotational range of motion (RROM) in the sacroiliac joint has been of increasing interest to surgeons as evidence grows in support of the sacroiliac joint as a pain generator. The sacroiliac joint pain may stem from pregnancy (SIJ dysfunction), adjacent segment disease, trauma, anatomical variations such as excessive lumbar lordosis, osteoarthritic, inflammatory arthritis, etc. In many cases, the etiology may be treated with fusion of the sacroiliac joint.

Development in implants aim to ensure fixation and promote rapid fusion. Patients that receive sacroiliac joint fixation receive revision surgery 30.8% of the time compared to only 5.7% of patients that receive sacroiliac joint fusion. The revisions may be due to loosening of the screws, which lead to the reoccurrence of sacroiliac joint pain. As such, there currently exists a need to combine the clinical benefit of limiting the rotational range of motion, while being able to provide fixation and precise insertion methods of an implant to provide fusion.

SUMMARY OF THE INVENTION

To meet this and other needs, implants, assemblies, and methods are provided. In particular, the sacroiliac joint may be fixated and/or fused via a non-threaded implant. The implant may have a triangular body configured to prevent or minimize rotational motion of the implant and to promote fixation and fusion of the sacroiliac joint. The implant may include an inner core or an outer shell, which provides structural support for a lattice structure. The structural geometry may be generated through topology optimization software, such as finite element analysis, based on anatomical loading conditions for the implant. The geometry may be irregular, non-uniform, non-structured, or amorphous with unique patterns suited to each implant style. These implants may be used in bilateral, open, and percutaneous approaches to the spine and/or ilium and may be compatible with robotic and/or navigation systems.

According to one embodiment, a sacroiliac implant includes a dowel extending along a central longitudinal axis having a distal tip configured to facilitate insertion into bone and a proximal end configured to be engaged by an instrument. The dowel has a triangular cross-section with three faces and three vertices configured to limit rotational motion about the central longitudinal axis. The dowel includes a solid portion for providing structural integrity and a lattice portion for facilitating bone growth. The solid portion includes an amorphous geometry optimized based on anatomical loading conditions for the implant.

The sacroiliac implant may include one or more of the following features. The amorphous geometry for the solid portion may be developed by finite element analysis (FEA). The solid portion may include an inner core, for example, having an outer framework with three beams forming the three vertices of the dowel and an inner framework having the amorphous geometry. The amorphous geometry may define a plurality of irregular openings that vary in shape and size. The lattice portion may surround the inner framework and fills in the irregular openings. The distal tip may be a self-broaching tip with stepped cutting flutes in the form of concentric rings. The solid portion may include an outer shell, for example, having solid walls with non-uniform windows. The lattice portion may be a block sized and dimensioned to fit within the outer shell. The lattice portion may be securable to the outer shell with a spring latch.

According to one embodiment, a sacroiliac implant includes a structural core extending along a central longitudinal axis having a tapered nose configured to facilitate insertion into bone and a proximal end configured to be engaged by an instrument. The structural core has three fins extending outward from the central longitudinal axis. Three outer insert trays are receivable within respective channels defined between adjacent fins of the structural core, thereby forming a triangular outer shape for the implant.

The sacroiliac implant may include one or more of the following features. The fins may be oriented at 120-degree intervals from each other. Each fin may have a base portion with tapered planar sides and a tip portion with a triangular tip. Each insert tray may include a multi-faceted inner surface configured to fit against the base portions of the fins. Each insert tray may include an outer surface defining a lattice structure. The lattice structure may include a porous scaffold configured to promote bone growth surrounded by a rim.

According to one embodiment, a method for stabilizing a sacroiliac joint includes (a) providing an implant having a triangular cross-section with three faces and three vertices, wherein the implant includes a solid portion for providing structural integrity and a lattice portion for facilitating bone growth, wherein the solid portion includes an amorphous geometry with irregular openings optimized based on anatomical loading conditions for the implant; (b) accessing an ilium of a patient; and (c) inserting the implant across the sacroiliac joint such that once the implant is fully seated, the implant prevents rotational motion of the implant. The method may include inserting multiple implants across the sacroiliac joint to better stabilize and prevent movement of the joint. The method may include accessing the sacroiliac joint with a robotic and navigational system.

Also provided are kits including implants of varying types and sizes, bone fasteners, spinal rods, k-wires, insertion tools, instruments, bone cement, biomaterials, and other components for performing the procedure(s).

BRIEF DESCRIPTION OF THE DRAWINGS

A more complete understanding of the present invention, and the attendant advantages and features thereof, will be more readily understood by reference to the following detailed description when considered in conjunction with the accompanying drawings, wherein.

DETAILED DESCRIPTION OF THE INVENTION

Implants, assemblies, and systems are configured to fixate and/or fuse the sacroiliac joint. The implants may be non-threaded with triangular bodies, which are configured to promote bone fixation and/or prophylactically fuse the sacroiliac joint. The bone implants may be used independently or may include the capability to integrate with long rod constructs, for example, with a tulip or other suitable attachment interface, to prophylactically fuse the sacroiliac joint.

These implants may be used in bilateral, open, and percutaneous approaches to the spine and/or ilium and may be compatible with robotic, imaging, and/or navigation systems. Further details of robotic and/or navigational systems can be found, for example, in U.S. Pat. Nos. 10,675,094, 9,782,229, and U.S. Patent Publication No. 2017/0239007, which are incorporated herein by reference in their entireties for all purposes.

Although described herein with reference to the sacroiliac joint, it will be appreciated that the devices described herein may be applied to other areas of the spine, other orthopedic locations in the body, and other medical procedures, such as trauma applications. Any of the implants described herein may be offered in a multitude of styles, sizes, and lengths, helping to ensure optimal patient fit.

The implants or components thereof may be comprised of titanium, stainless steel, cobalt chrome, cobalt-chrome-molybdenum, tungsten carbide, carbon composite, plastic or polymer—such as polyetheretherketone (PEEK), polyethylene, ultra-high molecular weight polyethylene (UHMWPE), resorbable polylactic acid (PLA), polyglycolic acid (PGA), allograft, autograft, or combinations of such materials or any other appropriate material that has sufficient strength to be secured to and hold bone, while also having sufficient biocompatibility to be implanted into a body. Although the above list of materials includes many typical materials out of which implants may be made, it should be understood that implants comprised of any appropriate material are contemplated.

Figure 1A:
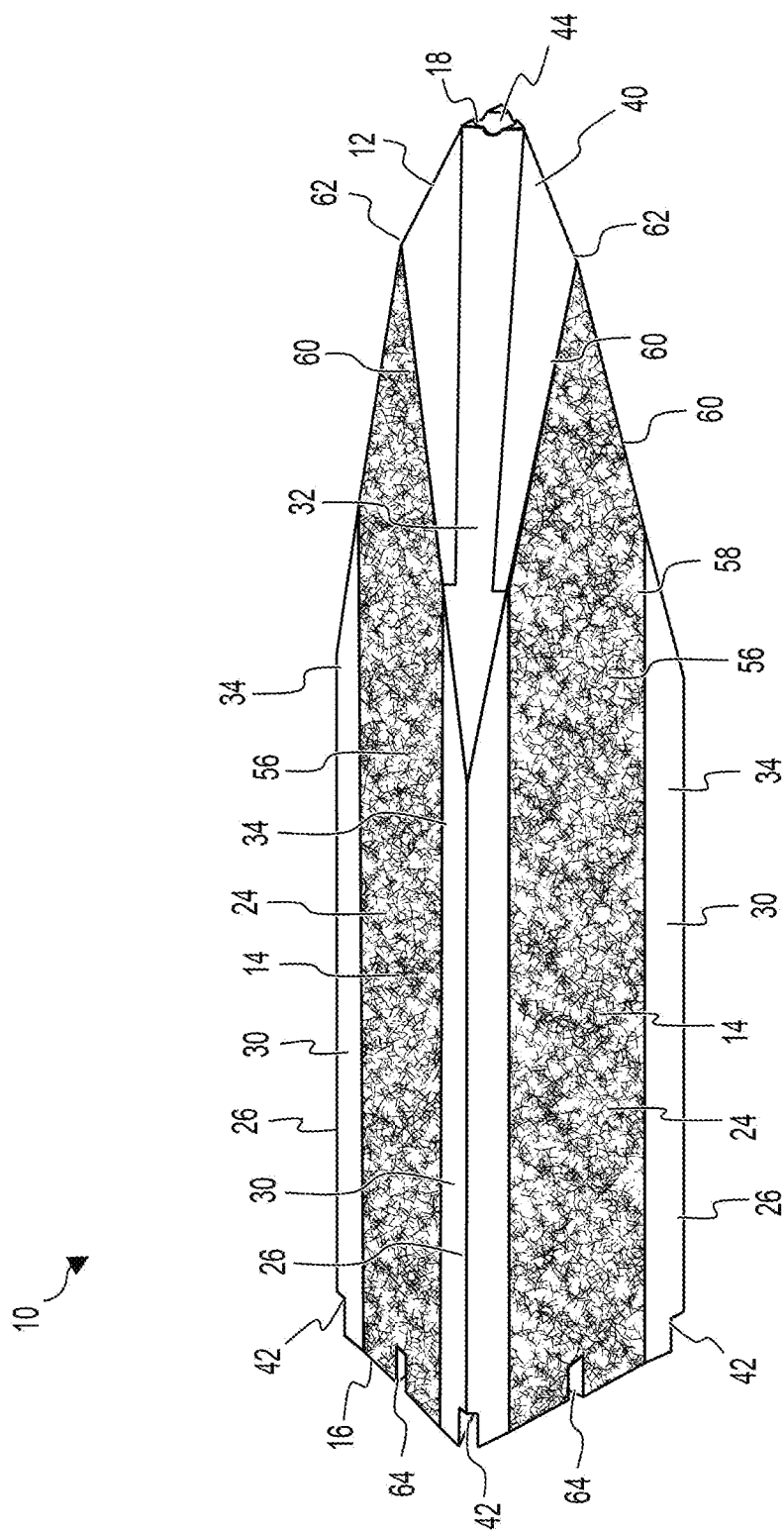
FIGS. 1A-1B show perspective and front views, respectively, of a triangular sacroiliac implant having an inner core with projecting fins and outer insert trays with lattice according to one embodiment.
Figure 1B:
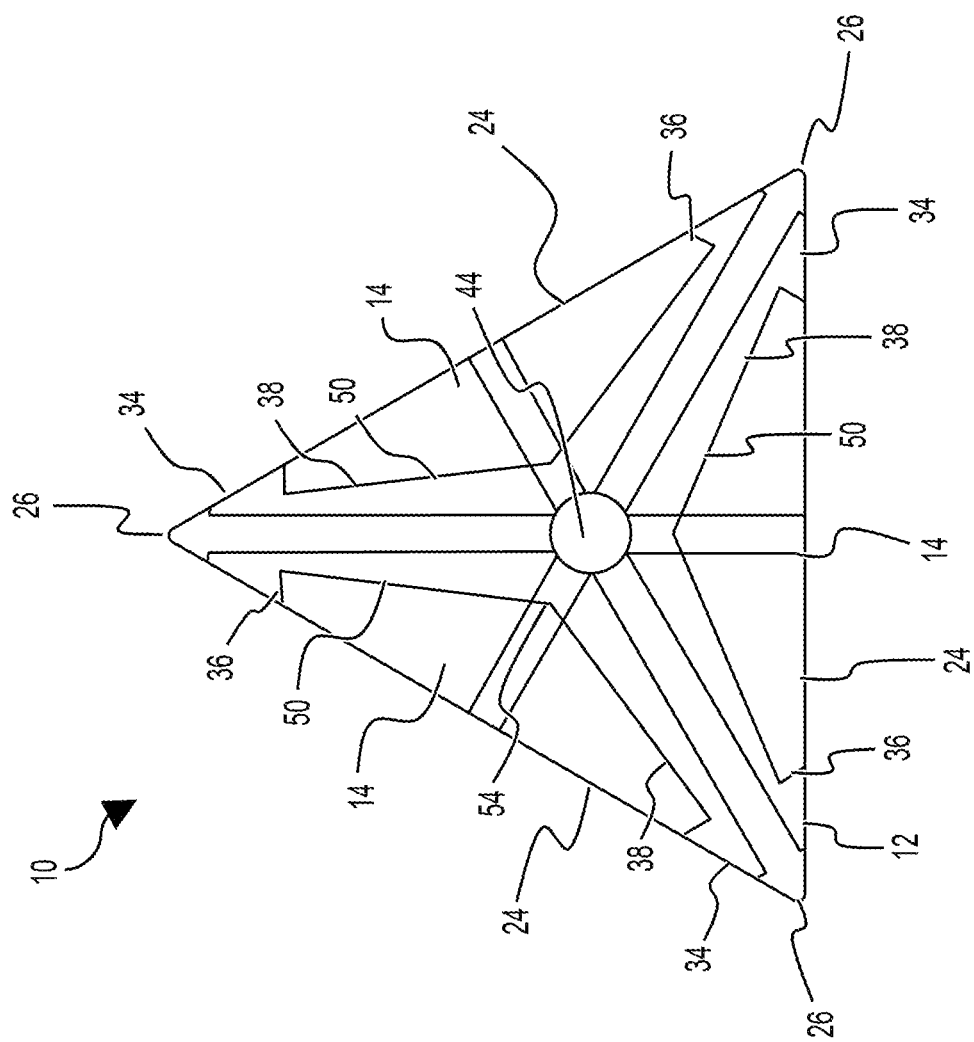

Turning now to the figures, where like reference numbers may refer to like elements, FIGS. 1A-1B shows an orthopedic fixation device, triangular dowel, or triangular implant 10 according to one embodiment. The implant 10 may include an inner or internal core 12, which provides structural support for outer lattice insert trays 14. The outer insert trays 14 may include a lattice structure 56 configured to promote bony growth and improve bone interface strength. The implant 10 extends from a proximal end 16 to a distal end 18 along a central longitudinal axis 20. The distal end 18 may have a tapered nose 40 configured to enter the bone first, and the proximal end 16 may be configured to engage bone or be otherwise secured to a rod construct. The implant 10 may be precisely inserted into bone to limit the rotational range of motion and prophylactically fuse the sacroiliac joint. In addition, the implant 10 may be configured for ease of removal, if necessary.

With further emphasis on the front view of implant 10 shown in FIG. 1B, the implant 10 may define a polygonal outer shape, such as a three-sided polygon having a triangular cross-section. The assembled implant 10, including inner core 12 with three outer insert trays 14 attached thereto, may have a general triangular prism shape including three outer surfaces or faces 24 and three angled corners or vertices 26. The outer surfaces or faces 24 may be generally flat or planar faces. The vertices 26 may be sharp or pointed or otherwise configured to engage bone. In one embodiment, the outer periphery of the implant 10 is an equilateral triangle with three equal planar faces 24 and three equal vertices 26 of the same angle. The outer triangular shape of the implant 10 is configured to provide rotational and axial fixation in the bone.

Figure 2A:
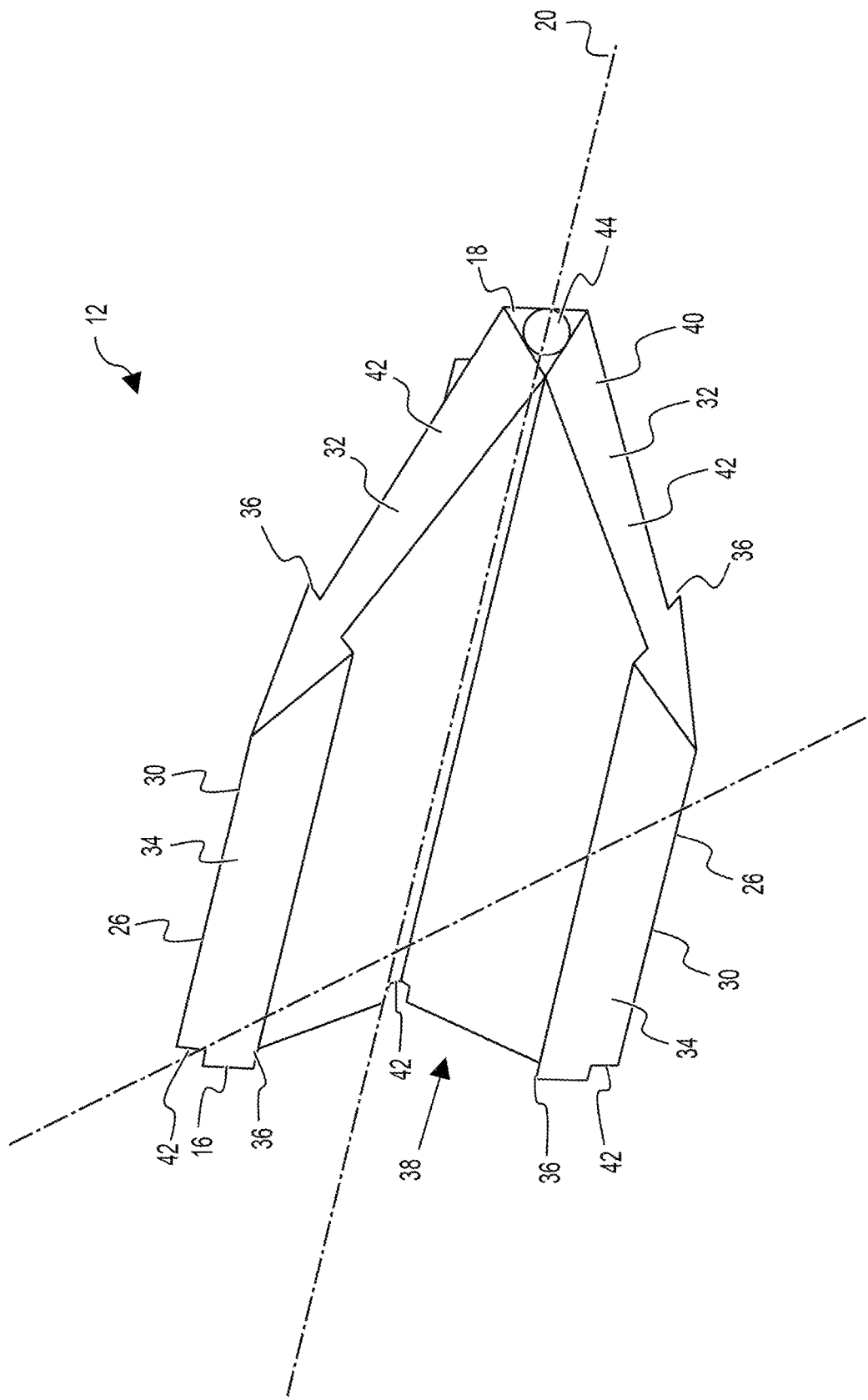
FIGS. 2A-2B show the inner core and outer insert trays for the triangular sacroiliac implant of FIGS. 1A-1B.

The internal core 12 is configured to hold three outer insert trays 14, thereby resulting in the overall outer triangular shape of implant 10. As best seen in FIG. 2A, the internal core 12 may include a body with three wings or fins 30 extending outward from the central axis 20. The fins 30 may extend outward from the central axis 20 and may be oriented at 120-degree intervals from each other, giving the core 12 a symmetrical, three-fold rotational symmetry. Each fin 30 may have a base portion 32 and a tip portion 34. The base portion 32 may have flat, planar sides with a taper. For example, as the base portion 32 extends from the central axis 20 out toward the tip portion 34, the base portion 32 may have a greater thickness near the base portion 32, which narrows gradually toward the tip portion 34. The fins 30 may have a solid construction or may define one or more windows to provide pathways for bony through-growth. In one embodiment, windows may be provided through the inner core 12, for example, between each face of the external profile of the assembled implant 10 to promote fusion.

The tip portion 34 of each fin 30 may form a triangular tip with a tapered design that narrows to a point, thereby forming the vertices 26 of the outer triangular shape of the implant 10. Opposite sides of each tip portion 34 may include an overhang 36 relative to the base portion 32. The areas of overhang 36 may form the bottom of the triangular tip portion 34. The areas of overhang 36 between adjacent fins 30 define a channel 38 configured to receive the insert tray 14. In other words, three separate insert trays 14 are receivable within three respective channels 38 defined between adjacent fins 30. Each channel 38 may further be defined by the walls of the base portion 32 of each fin 30. As best seen in FIG. 1B, the walls of the base portions 32 may define angled insets, for example, having a 120-degree angled recess for receiving the insert tray 14. In this manner, the inner surface 50 of each insert tray 14 may be configured to contact the walls of the base portion 32 of the fins 30. To prevent accidental disassembly of the insert trays 14 from the core 12, the core channels 38 may be cut non-parallel to the face of the insert trays 16. It will also be appreciated that one or more gaps may be formed between the insert tray 13 and fins 30 to allow for additional bony ingrowth, if desired.

The internal core 12 may form nose 40, which tapers toward the distal end 18, to facilitate insertion into bone. The nose 40 be blunt, pointed, or otherwise configured to engage bone. For example, a distal face 42 of each fin 30 may be tapered, angled, or beveled from the vertex 26 of the tip portion 34 toward the distal end 18 of the core 12. The distal face 42 of each fin 30, including base portion 32 and fin portion 34, may resemble an arrow pointing toward the proximal end 16 of the core 12. The core tip or nose 40 may have an angulation similar to a trocar tip to allow bony material to be pushed to the periphery of the outer profile of the implant 10. The angled nose 40 may also prevent bony ingrowth on its tip to make potential removals easier, if needed.

The proximal end 16 of the core 12 may include one or more notches 42. For example, angular notches 42 may be positioned along the central longitudinal axis 20 and on the tip portions 34 of each fin 30 at the proximal-most end 16. These notches 42 may be configured to interface with an implant holder or insertion instrument, for example. The internal core 12 may define a central cannulation 44 along the central longitudinal axis 20 between the proximal and distal ends 16, 18. The central cannulation 44 may include a generally cylindrical bore extending through the body of the core 12, for example, for guiding the implant 10 over a guide wire or k-wire.

Figure 2B:
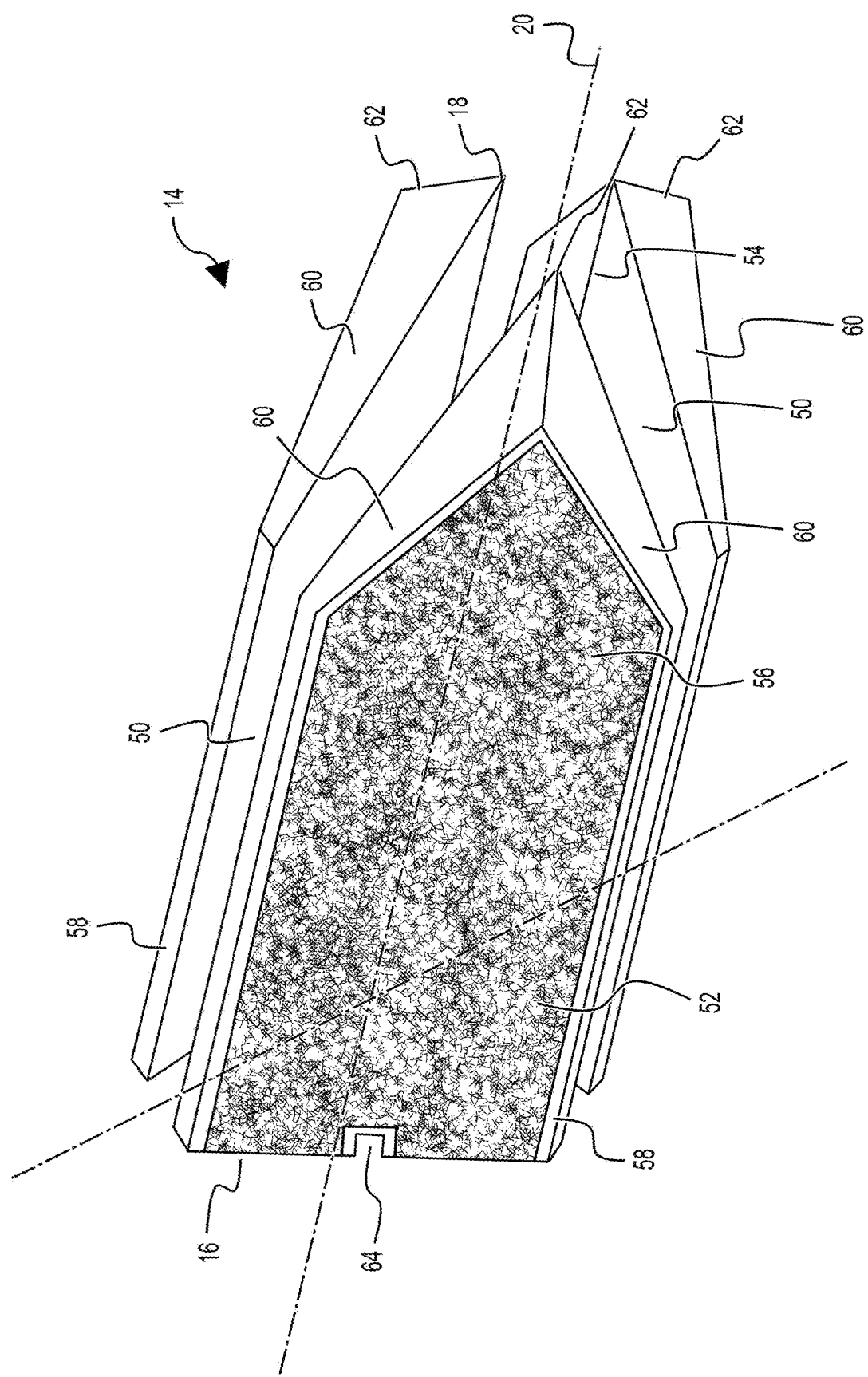

With emphasis on FIG. 2B, the insert trays 14 are shown in more detail. In this embodiment, the internal core 12 is configured to support three outer insert trays 14, thereby resulting in the triangular shape of implant 10. Each insert tray 14 includes an inner surface 50 and an outer surface 52. The inner surface 50 may include a multi-faceted surface with two areas that bend to create an angle of 120 degrees between adjacent facets. For example, the inner surface 50 may be bifurcated by a straight edge 54, which extends along the bend between the two adjoining planes of the inner surface 50. The straight edges 54 of each tray 14 may be parallel with the longitudinal axis 20 of the implant 10. As best seen in FIG. 1B, the inner surface 50 of the tray 14 may be configured to contact the bottom surface of channel 38 when the insert tray 14 is positioned within each respective channel 38 in the core 12.

The outer surface 52 defines a lattice structure 56, which provides a scaffold for bone healing and bone interdigitation. The lattice structure 56 may include a uniform or non-uniform lattice. The lattice structure 56 may include a porous scaffold structure, for example, including micropores. As the bone heals, the bone grows into the microporous structure further enhancing fixation. In some embodiments, the lattice structure 56 may have grid, honeycomb, hexagonal struts, or other patterns to promote bony in-growth. The lattice structure 56 may include a randomized or repeating pattern of open or interconnected pores. The lattice structure 56 may also vary in type, size, or porosity, for example, along the length of the implant 10. The pores may be spherical, partially spherical, or of another suitable pore shape or configuration. The lattice structure 56 may have a suitable porosity (open volume), for example, greater than 50% open, greater than 60% open, greater than 70% open. In one embodiment, the lattice structure 56 may have a porosity in the range of about 50-80% to maximize the potential for bony in-growth. The lattice structure 56 may have pore sizes, for example, ranging from approximately 100 µm-2 mm, approximately 100 µm-1 mm, approximately 200-900 µm, or approximately 300-800 µm in diameter. Additional details on suitable porous structures are described, for example, in U.S. Pat. No. 10,524,926, which is incorporated by reference herein in its entirety for all purposes.

The insert trays 14 may have a solid or smooth area absent of lattice structure 56, thereby adding structural integrity to the tray 14. The lattice structure 56 may be surrounded by a solid edge, rim, or wall 58. In other words, the outer perimeter of the tray 14 may form a solid wall 58 and the inner area may be filled with the lattice structure 56. The thickness, depth, or volume of the lattice structure 56 may be provided to optimize bone growth. In addition, the thickness of the lattice structure 56 may be oversized for an increased press-fit of the implant 10. The edges of the tray 14 may be straight and meet at sharp angles. The distal end 18 of each tray 14 may have a triangular shape with trapezoidal faces 60 that taper to a point or distal edge 62. The proximal end 16 of each tray 14 may have a notch 64, such as a square recess, which may be similar to notches 42. The proximal notches 64 may be centrally located on the back of each tray 14 and configured to interface with an implant holder or insertion instrument, for example. As best seen in FIG. 1A, the insert trays 14 may fit within channels 38 between fins 30 and extend from the distal end 16 of the implant 10 while revealing a portion of nose 40 of the core 12. The insert trays 14 may include optional through-growth windows on the back side of the trays 14, which mate with corresponding windows (not shown) in the core internal faces to further promote bony through-growth between each face of the external profile in the assembled implant 10.

In one embodiment, the implant 10 may be created via a hybrid build with the internal core 12 manufactured using traditional methods rather than three-dimensional (3D) printing. The internal core 12 may be made, for example, by machining the core 12 from titanium. The core 12 provides the structural support for the insert trays 14. Although titanium is exemplified, it will be appreciated that the core 12 may be made of a variety of materials, offering flexibility in material selection, to increase structural integrity of the implant 10. The insert trays 14 may be created by additive manufacturing, such as three-dimensional (3D) printing. The additive manufacturing may include direct metal laser sintering (DMLS), powder bed fusion, vat photopolymerization, material jetting, lamination, extrusion, directed energy deposition, or any other suitable additive manufacturing process. Further, one or more surface treatments may be used to increase the frictional force between internal components and/or to enhance bone fusion.

After the components are built, the insert trays 14 may be assembled to the core 12. The insert trays 14 may be inserted through the back of the core 12 prior to implantation or intra-operatively. The trays 14 may be secured to the inner core 12 via a press-fit engagement, a threaded retention feature, or other suitable securing mechanism. The implant 10 may be implanted across the sacroiliac joint to fixate and fuse the joint. Once implanted in the sacroiliac joint, the trays 14 and core 12 provide anti-rotational features to help stabilize the implant 10. The lattice structure 56 may help to promote bony ingrowth and improve bone interface strength over time.

Figure 3A:
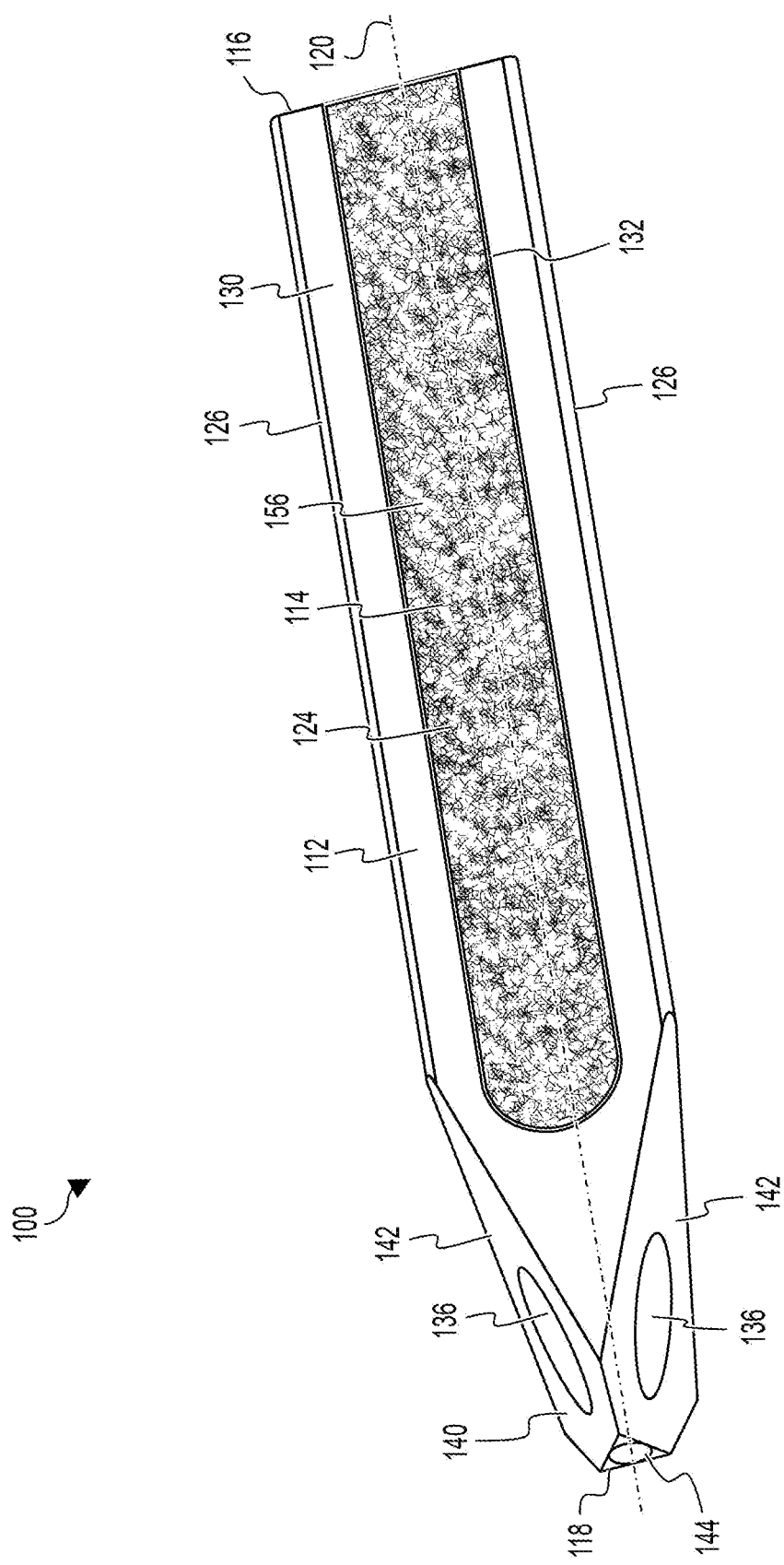
FIG. 3A-3B show perspective and front views, respectively of a triangular sacroiliac implant having a main structural body with open channels and overlaying lattice walls according to one embodiment.
Figure 3B:
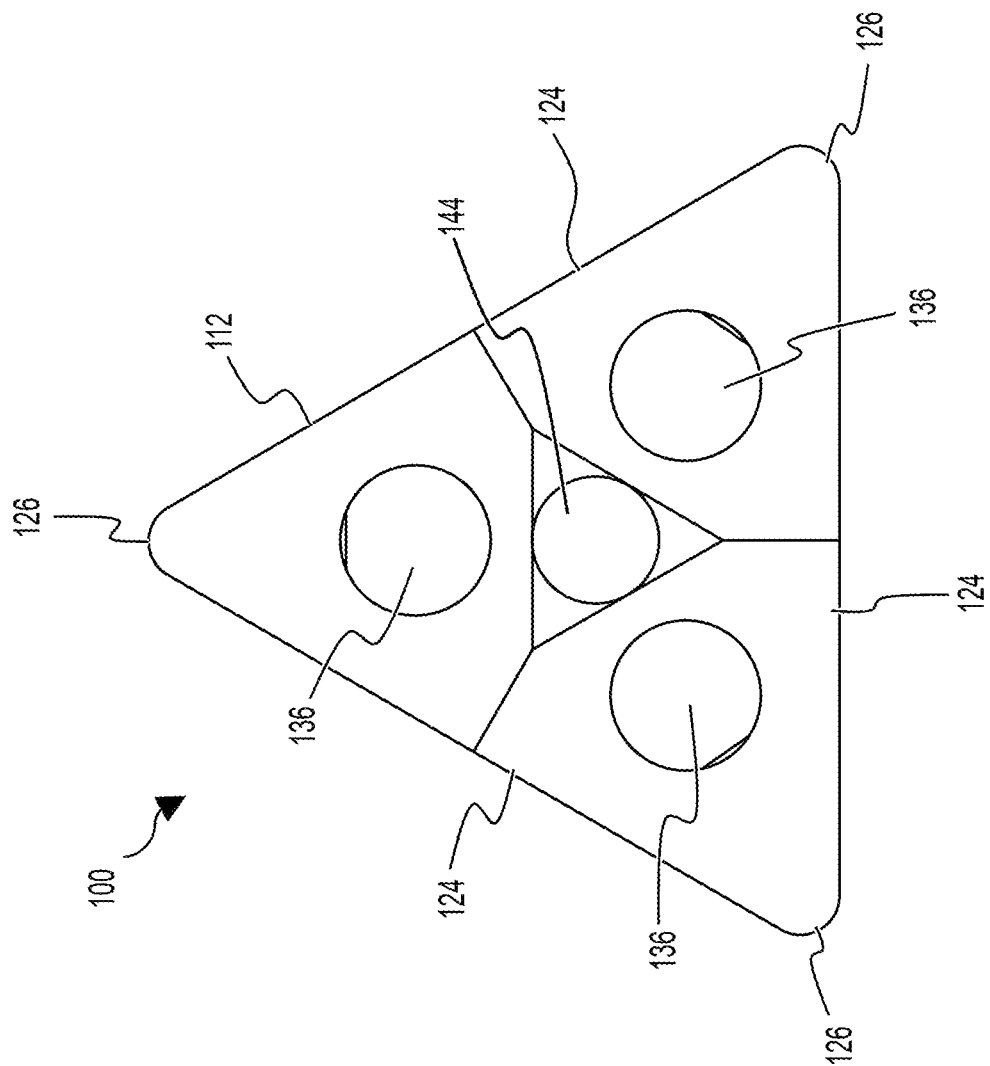

Turning now to FIGS. 3A-3B, an orthopedic fixation device, triangular dowel, or triangular implant 100 is shown according to one embodiment. Implant 100 includes an inner or internal core 112 with lattice insets or walls 114. The internal core 112 acts as the internal structure, which supports the lattice walls 114. The internal core 112 may have open channels 134, which lay underneath the layer of lattice 156 to promote fusion. The lattice structure 156 may also help to promote bony growth and improve bone interface strength. The implant 100 extends from a proximal end 116 to a distal end 118 along a central longitudinal axis 120. The distal end 118 may have a tapered nose 140 configured to enter the bone first, and the proximal end 116 may be configured to engage bone or be otherwise secured to a rod construct. The implant 100 may be precisely inserted into bone to limit the rotational range of motion and prophylactically fuse the sacroiliac joint.

With further emphasis on the front view of implant 100 shown in FIG. 3B, the implant 100 may define a polygonal outer shape, such as a three-sided polygon having a triangular cross-section. The implant 100 may have a general triangular prism shape including three outer surfaces or faces 124 and three angled corners or vertices 126. The outer surfaces or faces 124 may be generally flat or planar faces. In this embodiment, the vertices 126 may be smoothed, rounded, or curved into a gentle arc. In one embodiment, the outer periphery of the implant 100 is an equilateral triangle with three equal planar faces 124 and three equal vertices 126 of the same angle. The outer triangular shape of the implant 100 is configured to provide rotational and axial fixation in the bone.

Figure 4:
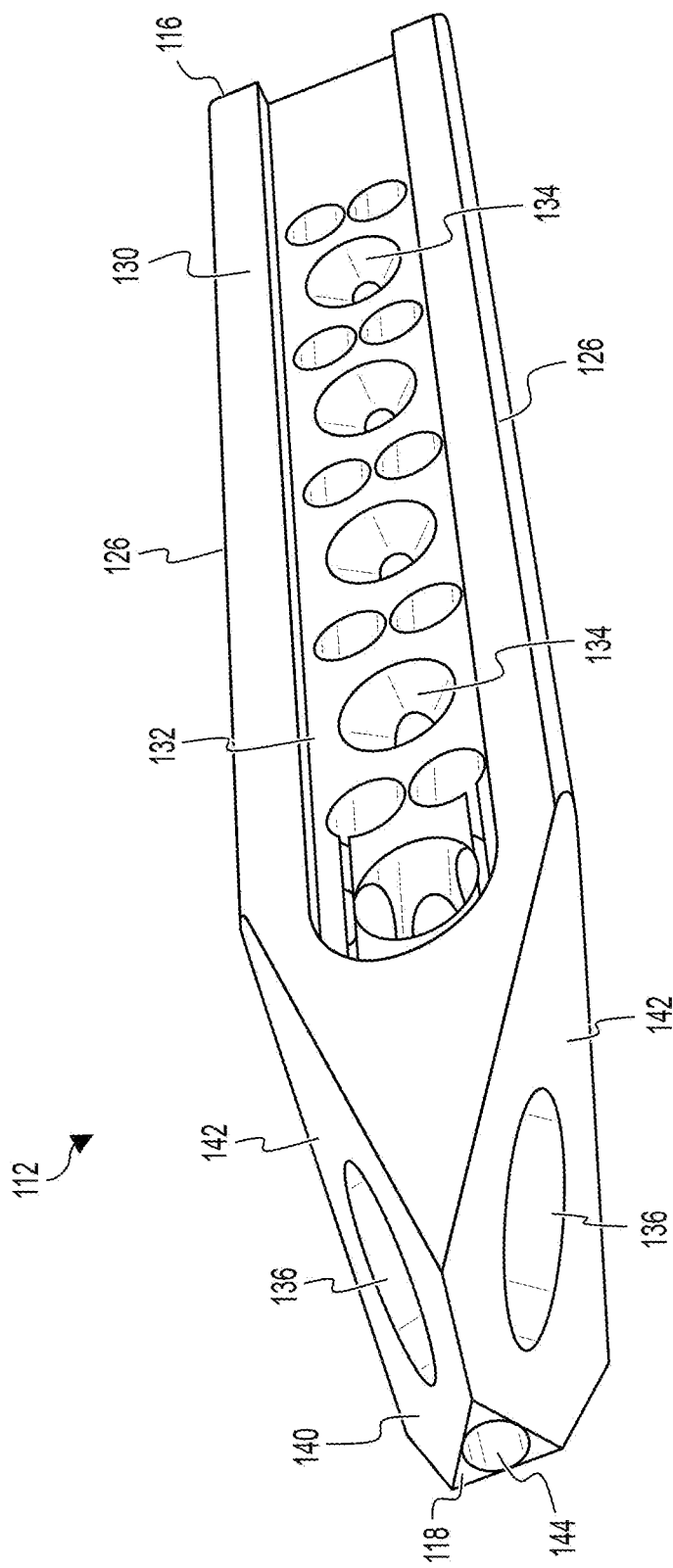
FIG. 4 shows a perspective view of the main structural body for the triangular sacroiliac implant of FIGS. 3A-3B.

The internal core 112 is configured to hold three lattice walls 114, thereby resulting in the outer triangular shape of implant 100. As best seen in FIG. 4, the internal core 112 may include a generally triangular body with three outer faces 130. Each outer face 130 may define a recessed or inset area 132 configured to receive the lattice wall 114. The inset area 132 may extend from the proximal end 116, a distance toward the distal end 118. The inset area 132 may resemble a U-shape or archway with two parallel sides with a semi-circle or arc connecting the parallel sides. The U-shape archway may form a blind recess near the nose 140 of the implant 100. The inset area 132 may be open to the proximal end 116, allowing access to the inset area 132. In this manner, if constructed with a hybrid assembly, each lattice wall 114 may be slid into the inset area 132 from the rear of the implant 100, thereby allowing for assembly of the implant 100.

The internal core 112 may have a solid construction or may define one or more windows 134 to provide pathways for bony through-growth. In one embodiment, a plurality of windows 134 may be provided through each inset area 132. Windows 134 from different sides or faces 130 may be in fluid communication with one another. The windows 134 may include cylindrical openings of different diameters. For example, a first set of circular windows 134 having larger diameters may be aligned centrally through inset area 132 and a second set of circular windows 134 having smaller dimeters may be arranged in pairs between the larger windows 134. It will be appreciated that any suitable shape, size, and configuration of windows 134 may be provided to promote fusion.

The internal core 112 may form nose 140, which tapers toward the distal end 118, to facilitate insertion into bone. The nose 140 may be blunt, pointed, or otherwise configured to engage bone. For example, three distal faces 142 may be tapered, angled, or beveled from the vertex 126 of the implant 100 to the distal end 118 of the core 112. Each face 142 may define a self-harvesting channel 136 to incorporate bony material left after drilling. Each self-harvesting channel 136 may be a circular or cylindrical opening cut non-perpendicular to the tapered distal faces 142. As best seen in FIG. 3B, the self-harvesting channels 136 may be aligned parallel to the central longitudinal axis 120 of the implant 100, which results in oval-shaped or elliptical openings on each of the distal faces 142. The internal core 112 may define a central cannulation 144 along the central longitudinal axis 120 between the proximal and distal ends 116, 118. The central cannulation 144 may include a generally cylindrical bore extending through the body of the core 112, for example, for guiding the implant 100 over a guide wire or k-wire. The windows 134 may be in fluid communication with the cannulation 144.

The lattice insets 114 may include a wall or layer of lattice structure 156, which provide a scaffold for bone healing and bone interdigitation. Each layer of lattice 156 may be sized and shaped to fit within the inset area 132 in the core 112. For example, the lattice layer 156 may resemble a U-shape with two parallel sides and a semi-circle or arc connecting the parallel sides, which mimics the shape of the inset area 132. Similar to lattice structure 56, the lattice structure 156 may include uniform or non-uniform porous scaffold structure, for example, including micropores. The central body 112 and lattice 114 may be made as one 3D printed body or may be a hybrid assembly with the lattice portion 156 utilizing inserts similar to implant 10. As the bone heals, the bone grows into the lattice structure 156 and the open channels 134 in the core 112 further enhancing fixation.

Figure 5A:
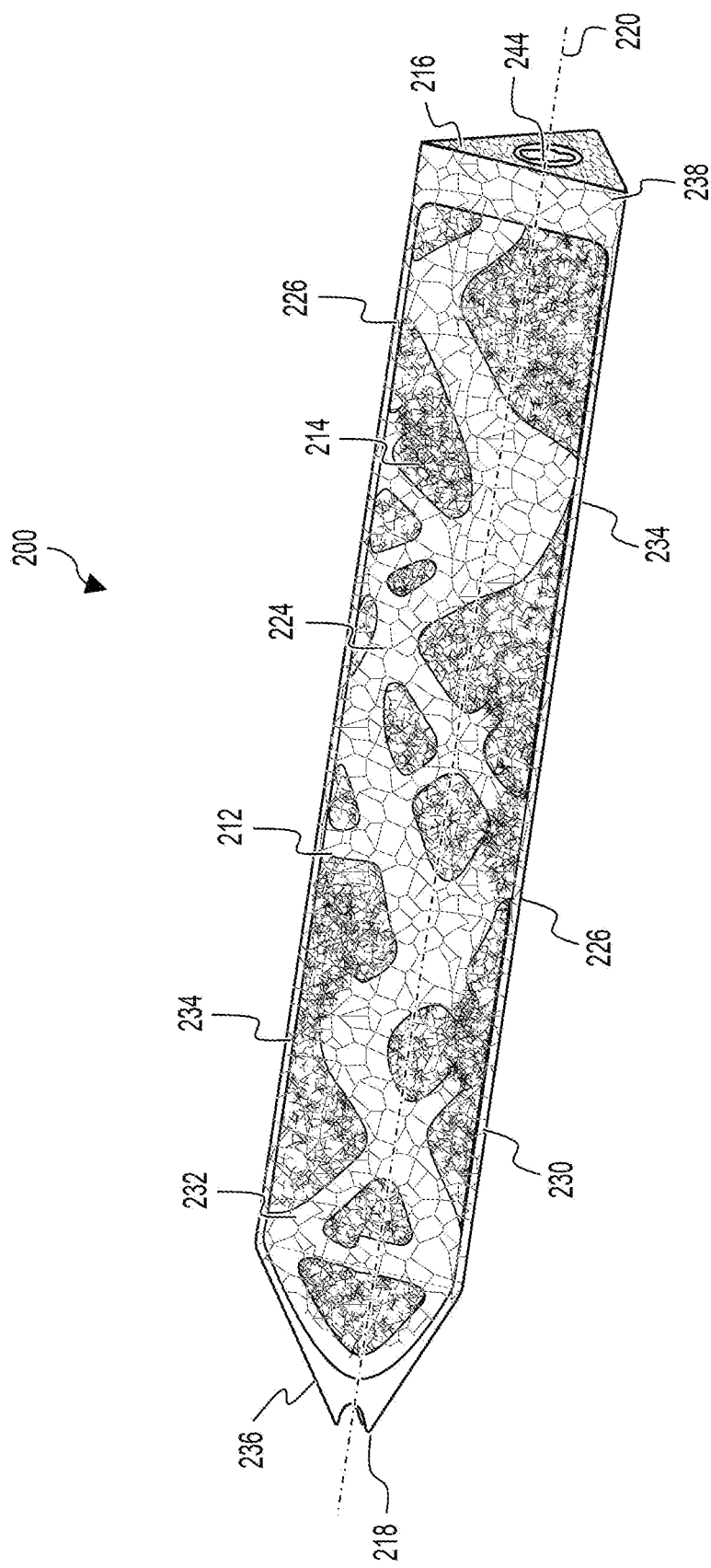
FIGS. 5A-5B show a triangular sacroiliac implant with an outer cage and inner framework having an amorphous geometry filled with a lattice structure according to one embodiment.
Figure 5B:
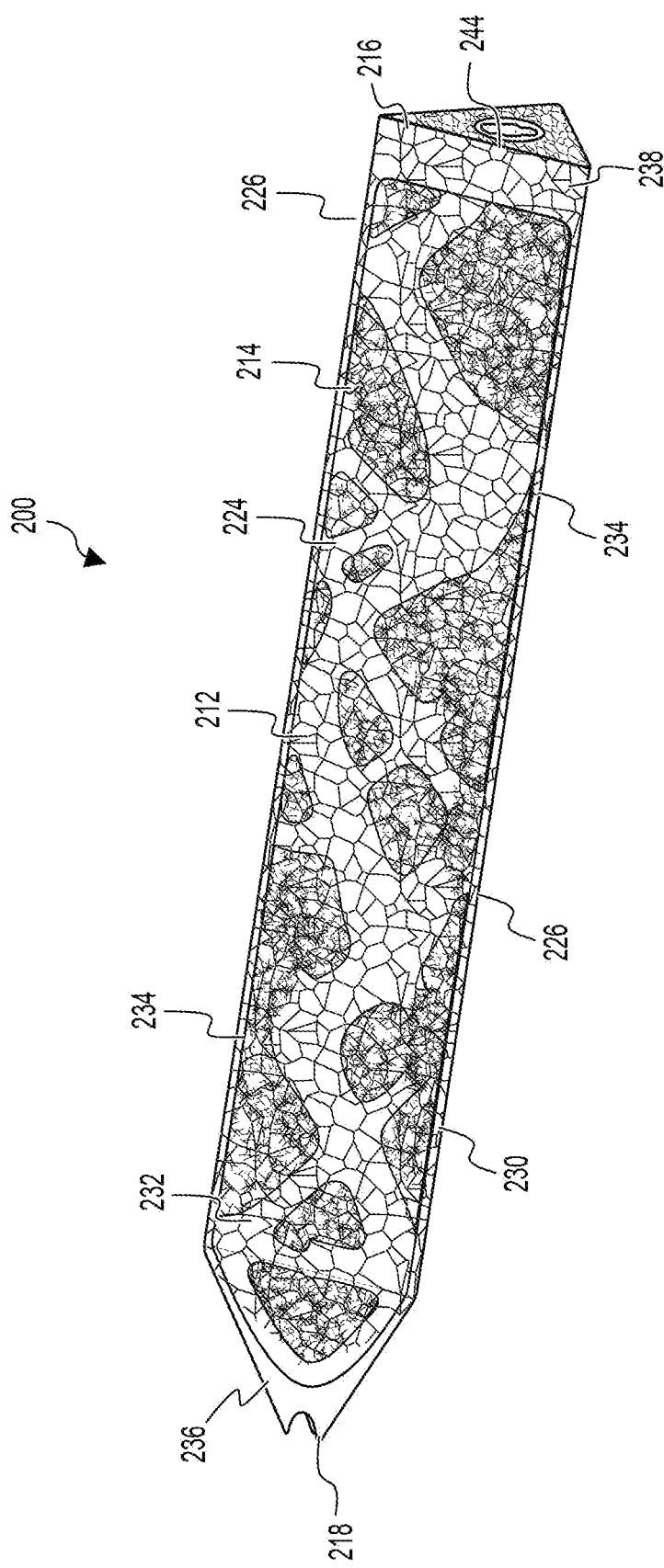

Turning now to FIGS. 5A-5B, an orthopedic fixation device, triangular dowel, or triangular implant 200 is shown according to one embodiment. Implant 200 includes a structural core 212 surrounded with lattice 214. The skeleton of the structural core 212 may be determined from computational analysis to predict the implant's behavior under load and boundary conditions. The structure of implant 200 is configured to maximize strength and osteoregenerative volumes. The surrounding lattice 214 helps to promote bony growth and improve bone interface strength. The implant 200 extends from a proximal end 216 to a distal end 218 along a central longitudinal axis 220. The distal end 218 may have a triangular tip configured to enter the bone first, and the proximal end 216 may be configured to engage bone or be otherwise secured to a rod construct. The implant 200 may be precisely inserted into bone to limit the rotational range of motion and prophylactically fuse the sacroiliac joint.

Similar to implant 100, the implant 200 may define a polygonal outer shape, such as a three-sided polygon having a triangular cross-section. The implant 200 may have a general triangular prism shape including three outer surfaces or faces 224 and three angled corners or vertices 226. The outer surfaces or faces 224 may be generally composed of or filled with the lattice structure 214. The vertices 226 may be pointed or sharpened to facilitate insertion. In one embodiment, the outer periphery of the implant 200 is an equilateral triangle with three equal planar faces 224 and three equal vertices 226 of the same angle. The outer triangular shape of the implant 200 is configured to provide rotational and axial fixation in the bone. The structural core 212 may define a central cannulation 244 along the central longitudinal axis 220 between the proximal and distal ends 216, 218. The central cannulation 244 may include a generally cylindrical bore extending through the body of the core 212, for example, for guiding the implant 200 over a guide wire or k-wire 246.

Figure 6:
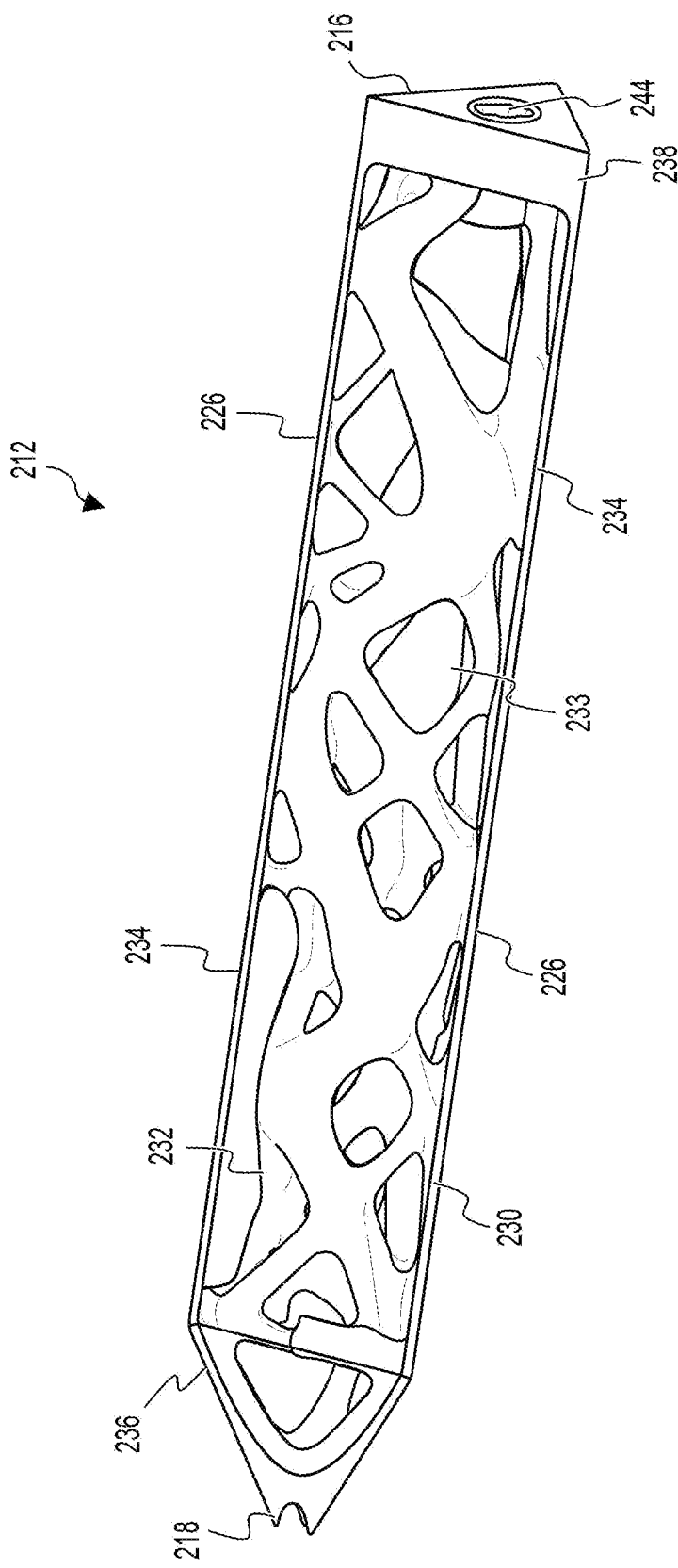
FIG. 6 shows the inner structural framework for the implant of FIGS. 5A-5B with the lattice structure omitted for clarity.

As best seen in FIG. 6, which omits the lattice structure for clarity, the structural core 212 may include an outer framework 230 and an inner framework 232. The outer framework 230 may include an outer cage with three supports or beams 234, which form the borders or edges of the vertices 226 of the triangle. The beams 234 may include thin straight strips of material, such as titanium, extending between a front end 236 and a rear end 238. The front end 236 may include a beveled or triangular tip with cutting edges to ease impaction and prevent radial breaking of bone upon insertion. The beveled tip of the front end 236 allows bony material to be packed on the distal tip and trapped into the lattice 214. The rear end 238 may have a triangular shape with each vertex connected to the respective beams 234.

The inner framework 232 may include an irregular, non-uniform, non-structured, or amorphous solid structure simulated or modeled from computational analysis, for example, using software on a computer. In one embodiment, the inner framework 232 may be developed and optimized using finite element analysis (FEA), solid mechanics simulations, dynamic analysis software, or other suitable engineering programs configured to model loads on a part and simulate the behavior of the part under specified conditions. In one embodiment, the structure of the inner framework 232 is generated using finite element analysis to predict the implant's behavior under load and boundary conditions. Finite element analysis may be software available on a computer, which may include at least a CPU (central processing unit), memory such as ROM (read only memory) and/or RAM (random access memory), communication means, input means such as a mouse or a keyboard, and output means such as a display. It will be appreciated that any suitable equipment and modeling software may be selected to optimize the structure of the inner framework 232.

Figure 7A:
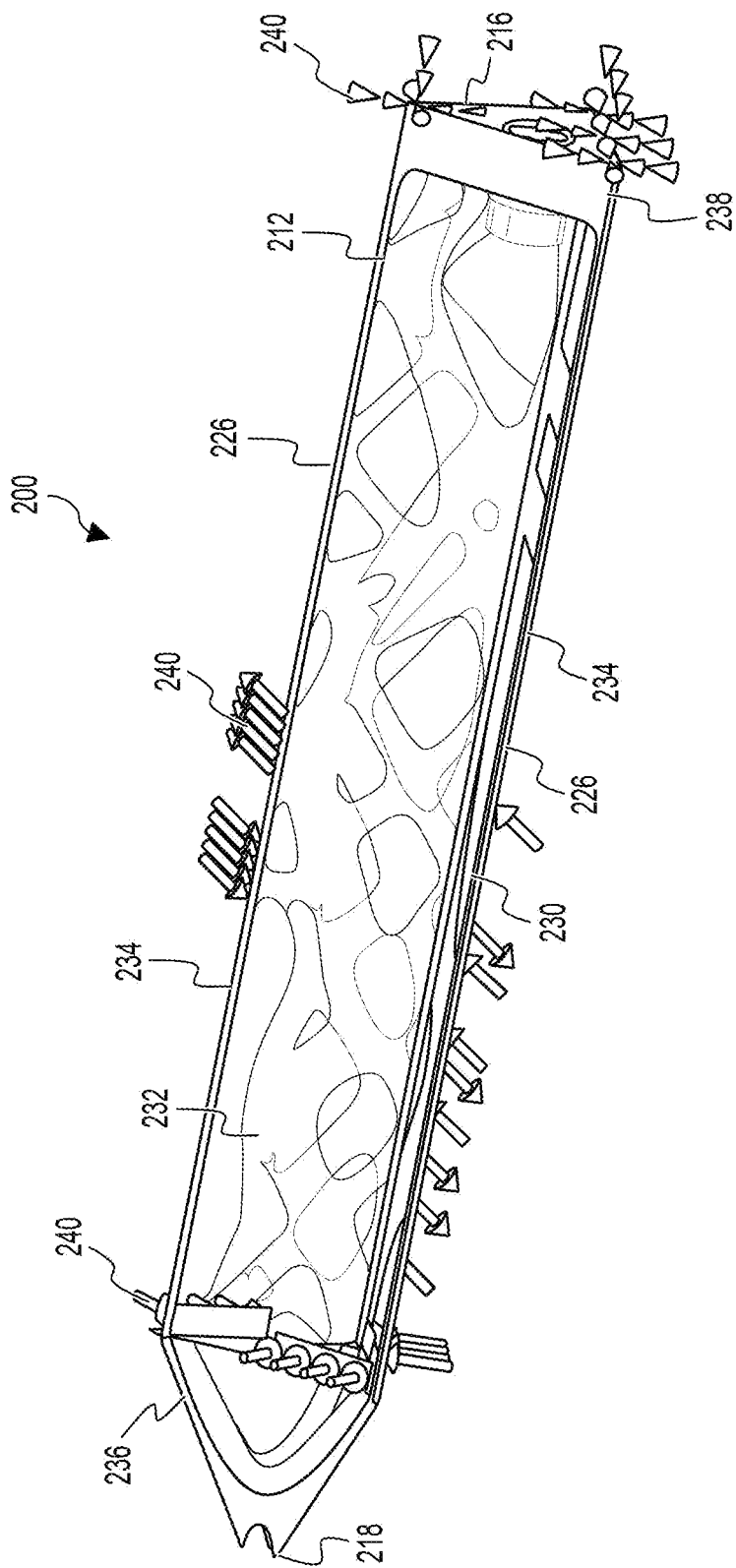
FIGS. 7A-7B show forces applied to the implant to create an optimized generative topology for the inner framework according to one embodiment.
Figure 7B:
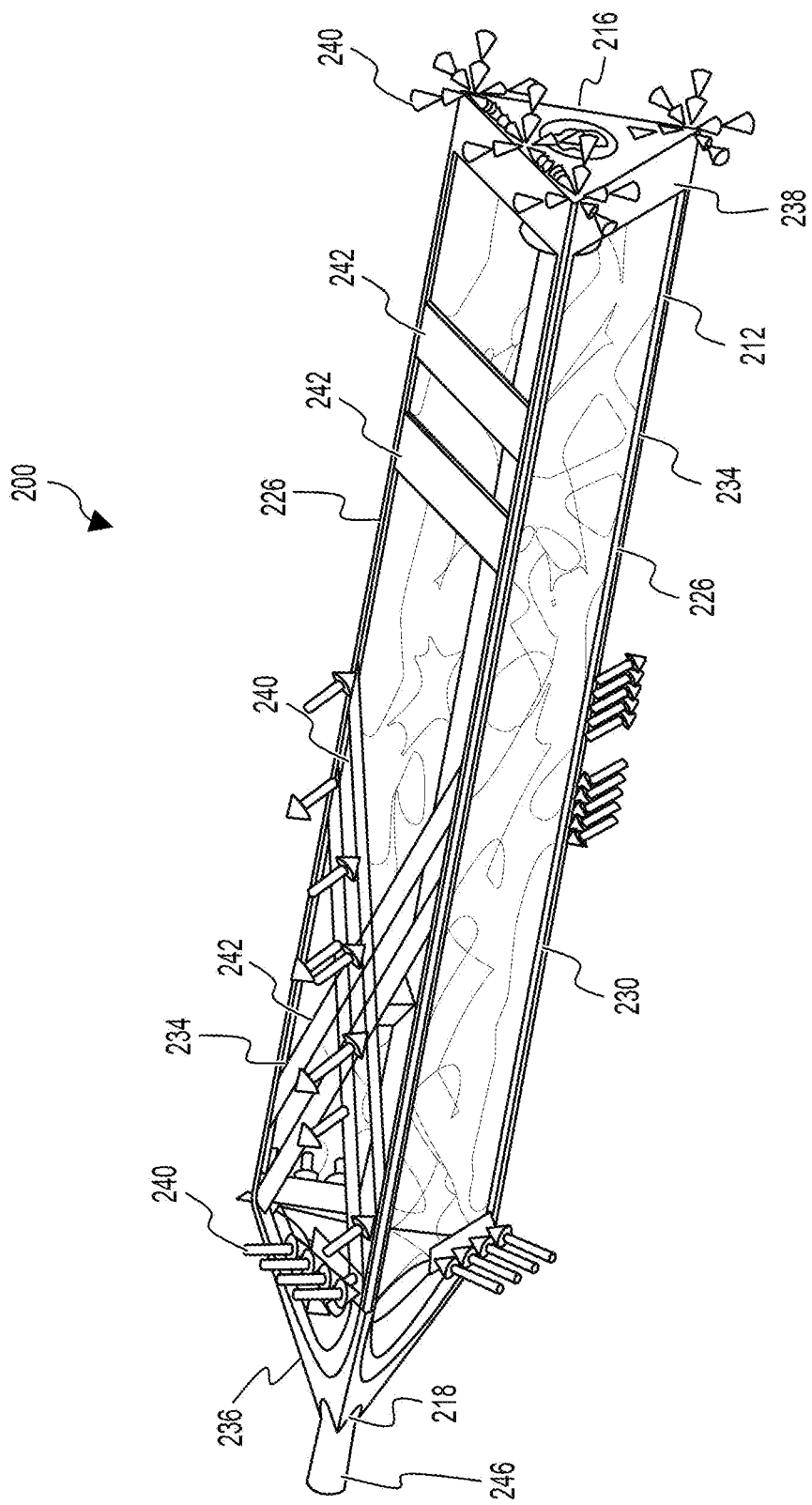

The finite element analysis may include modeling the implant, defining the material type and properties, and simulating loads or external forces acting on the body of the implant. As best seen in FIGS. 7A-7B, a plurality of specified loads or forces on the implant 200 are depicted by arrows 240. In FIG. 7B, additional struts 242 are provided between the beams 234, for example, as straight bracing and cross bracing with diagonal supports placed in an X-shaped manner. The load cases may be modeled for each indicated trajectory, implantation method, and/or worst-case load scenarios. The load cases may be applied as pressure, force, rotation moments, and/or bearing loads depending on the length of the implant 200 and its use. The loads may be applied in the direction of transferred forces at surfaces that align to typical patient anatomy for each trajectory available for a given implant length.

The finite element analysis may be used to model the inner framework 232 to maximize structural integrity and minimize structural volumes based on load cases expected. Based on the prior simulation and modeling, the inner framework 232 is created to define openings 233 of various shapes and sizes. The openings 233 may include a collection of holes and gaps that do not conform to a single shape or size standard. The openings 233 may be non-uniform and include a mix of irregularly shaped holes that vary in dimensions. The number, size, shape, and positioning of openings 233 may be optimized to maximize structural integrity while reducing the size or amount of material used in the construction of the framework 232. Each implant length may have its own unique structural core 212 to maximize strength and porous volume. In other words, each implant length may have a different irregular, non-uniform, non-structured, or amorphous geometry based on the load modeling.

The structural core 212 may be surrounded and/or filled with lattice 214, which may act as a scaffold for bone healing and bone interdigitation. Similar to lattice 56, the lattice structure 214 may include a uniform or non-uniform porous scaffold structure. In this embodiment, the finite element analysis simulation may also be used to maximize porous volumes and optimize the percentage of lattice volume, thereby further enhancing fixation and fusion of the sacroiliac joint.

Figure 8A:
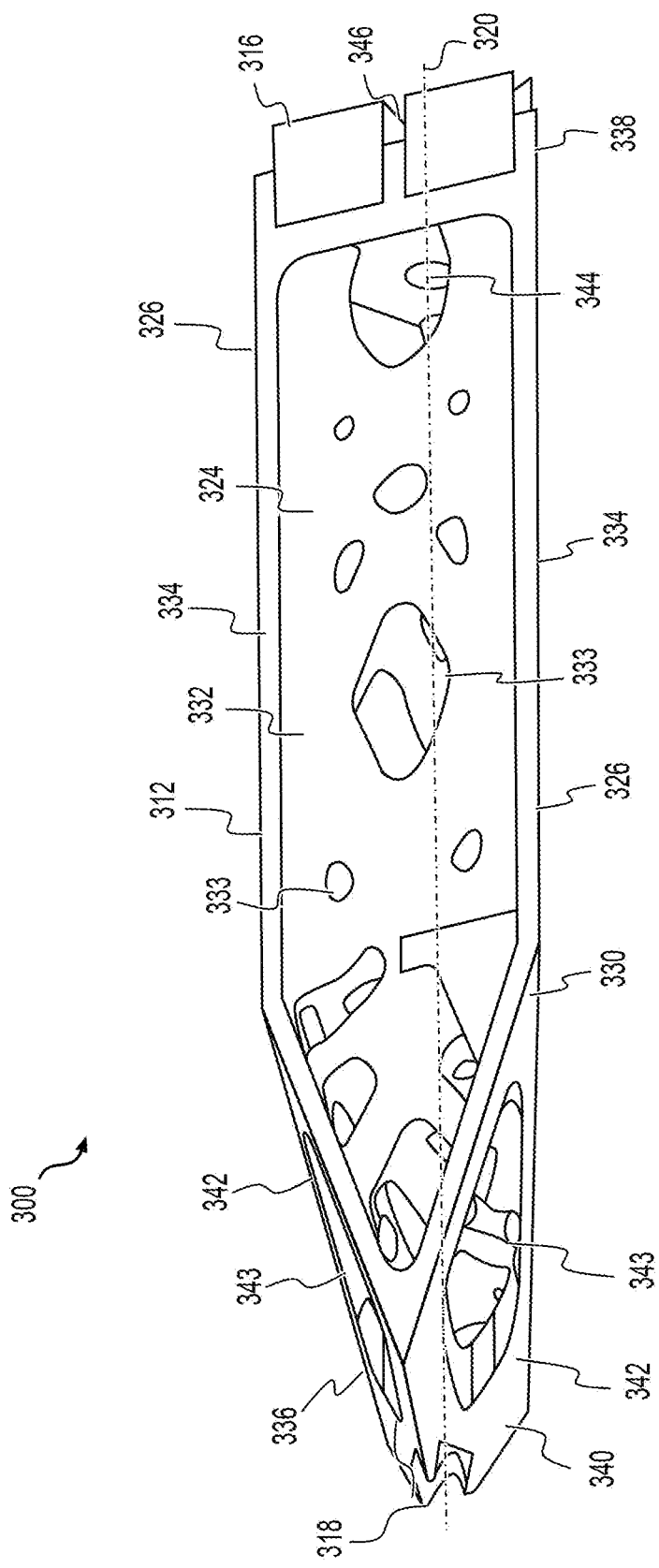
FIGS. 8A-8C show perspective, front, and rear views, respectively, of a triangular sacroiliac implant with an outer cage and an inner generative topography framework according to one embodiment.
Figure 8C:
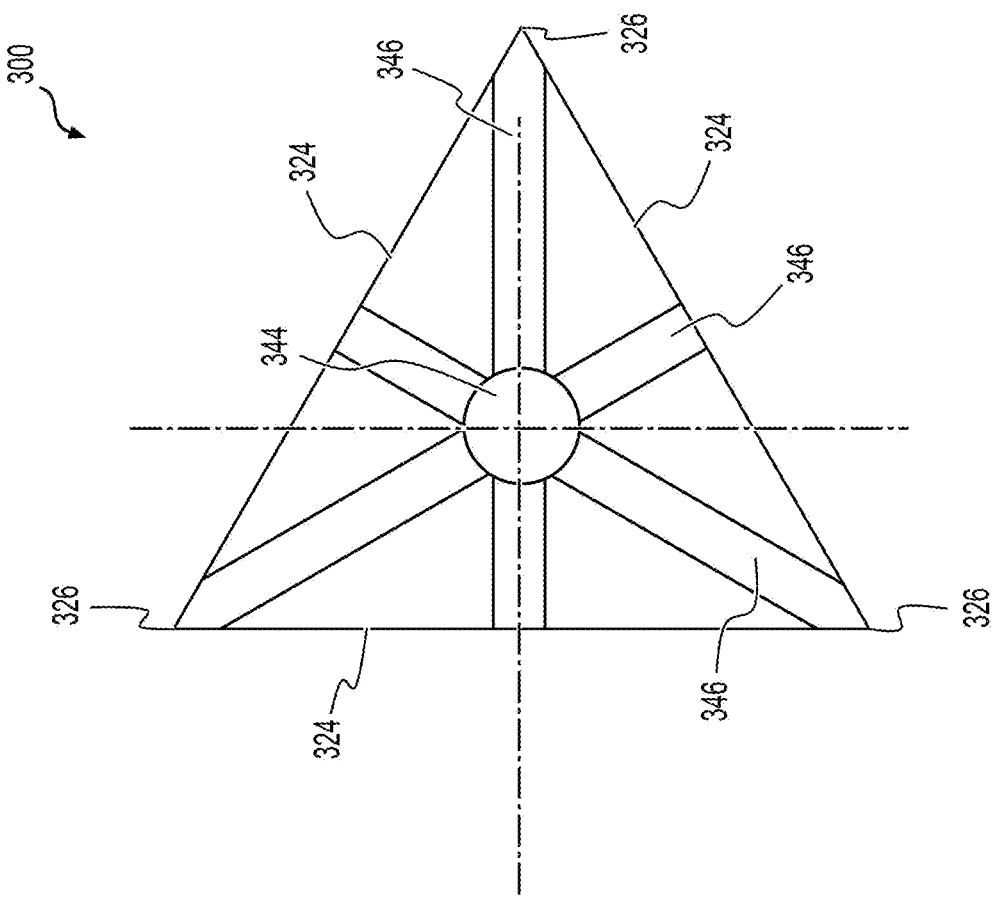
Figure 8B:
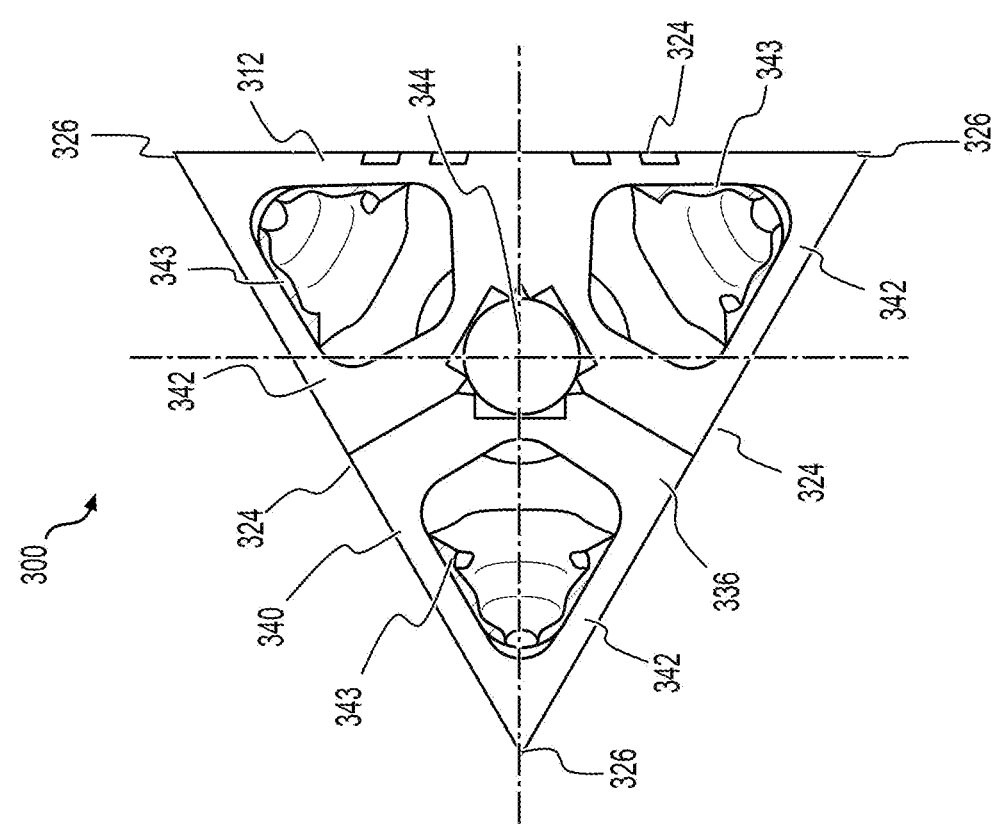

Turning now to FIGS. 8A-8C, an orthopedic fixation device, triangular dowel, or triangular implant 300 is shown according to one embodiment. Implant 300 is similar to implant 200 and includes a structural core 312, which may be modeled by computational analysis to predict the implant's behavior under load and boundary conditions. The openings 333 in the core 312 may be left open or may be optionally filled with lattice. The implant 300 extends from a proximal end 316 to a distal end 318 along a central longitudinal axis 320. The distal end 318 may have a triangular tip configured to enter the bone first, and the proximal end 316 may be configured to engage bone or be otherwise secured to a rod construct. The implant 300 may be precisely inserted into bone to limit the rotational range of motion and prophylactically fuse the sacroiliac joint.

Similar to implant 200, the implant 300 may define a polygonal outer shape, such as a three-sided polygon having a triangular cross-section. The implant 300 may have a general triangular prism shape including three outer surfaces or faces 324 and three angled corners or vertices 326. The outer surfaces or faces 324 may be generally composed of the inner framework 332. The vertices 326 may include the outer framework 330 with pointed or sharpened edges to facilitate insertion. In one embodiment, the outer periphery of the implant 300 is an equilateral triangle with three equal planar faces 324 and three equal vertices 326 of the same angle. The outer triangular shape of the implant 300 is configured to provide rotational and axial fixation in the bone. The structural core 312 may define a central cannulation 344 along the central longitudinal axis 320 between the proximal and distal ends 316, 318. The central cannulation 344 may include a generally cylindrical bore extending through the body of the core 312, for example, for guiding the implant 300 over a guide wire or k-wire.

The structural core 312 may include outer framework 330 and inner framework 332. The outer framework 330 may include an outer cage with three supports or beams 334 extending between a front end 336 and a rear end 338 of the implant 300. The three supports or beams 334 form the borders or edges of the vertices 326 of the triangle. The beams 334 may include thin straight strips of material, such as titanium. The front end 336 may form a nose 340, which tapers toward the distal end 318, to facilitate insertion into bone. The nose 340 may include a beveled or triangular tip with cutting edges to ease impaction and prevent radial breaking of bone upon insertion. For example, three distal faces 342 may be tapered, angled, or beveled from the vertices 326 of the implant 300 to the distal end 318 of the core 312.

Each distal face 342 may define a self-harvesting channel 343 to incorporate bony material left after drilling. Each self-harvesting channel 343 may be a non-circular opening cut through the tapered distal faces 342. The channels 343 may facilitate self-harvesting of material into the open framework 312 of the implant 300. The nose 340 may also be configured to push material toward the outer perimeter of the implant face. In other words, the tip's channels 343 may serve a dual purpose of self-harvesting and directing material to the outer perimeter of the implant 300.

The rear end 338 of the implant 300 may have a thickened triangular shape with each vertex connected to the respective beams 334. To ensure stability during the implantation process across the joint, grooves or channels 346 on the proximal end 316 of the implant 300 may be configured to mate with an implant holder, thereby preventing rotation. As best seen in FIG. 8C, the channels 346 may include three straight channels 346 crossed over the center axis 320 and extending from the vertex 326 to the base of the opposite face 324. It will be appreciated that other suitable configurations may be provided to interface with an instrument. The proximal end 316 of the implant 300 also provides stability and prevents rotation during implantation.

In the same manner as inner framework 232, inner framework 332 may include an irregular, non-uniform, non-structured, or amorphous solid structure, which was previously simulated or modeled by computational analysis, for example, using finite element analysis (FEA). The inner framework 332 may be a single body that has been 3D printed using a symmetric generative topography framework, which ensures the structural integrity of the implant 300. The inner framework 332 defines openings 333 of various sizes and shapes, which may be optimized to maximize structural integrity while reducing the size or amount of material used in the construction of the framework 332 based on load cases expected. Within the central region of the implant 300, the openings 333 may remain open or may be optionally filled with lattice. The lattice may include uniform lattice or non-uniform lattice. If present, the lattice may further provide a scaffold for bone healing and bone interdigitation. Each implant length may have its own unique structural core 312 to maximize strength and porous volume.

Figure 9A:
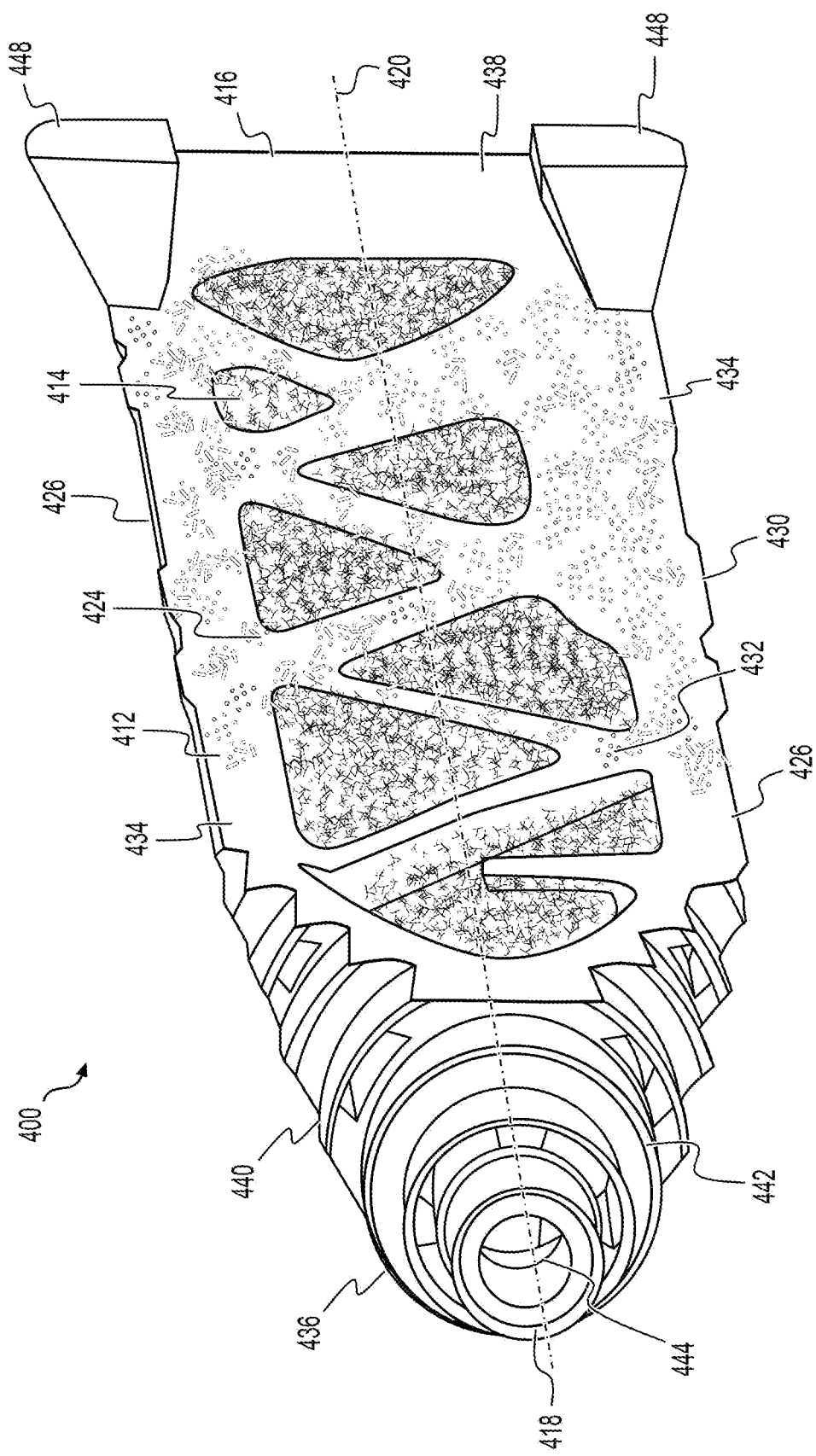
FIGS. 9A-9B show perspective and side views, respectively, of a triangular sacroiliac implant with an outer cage having a self-cutting tip, an inner generative topography framework, and a lattice structure according to one embodiment.
Figure 9B:
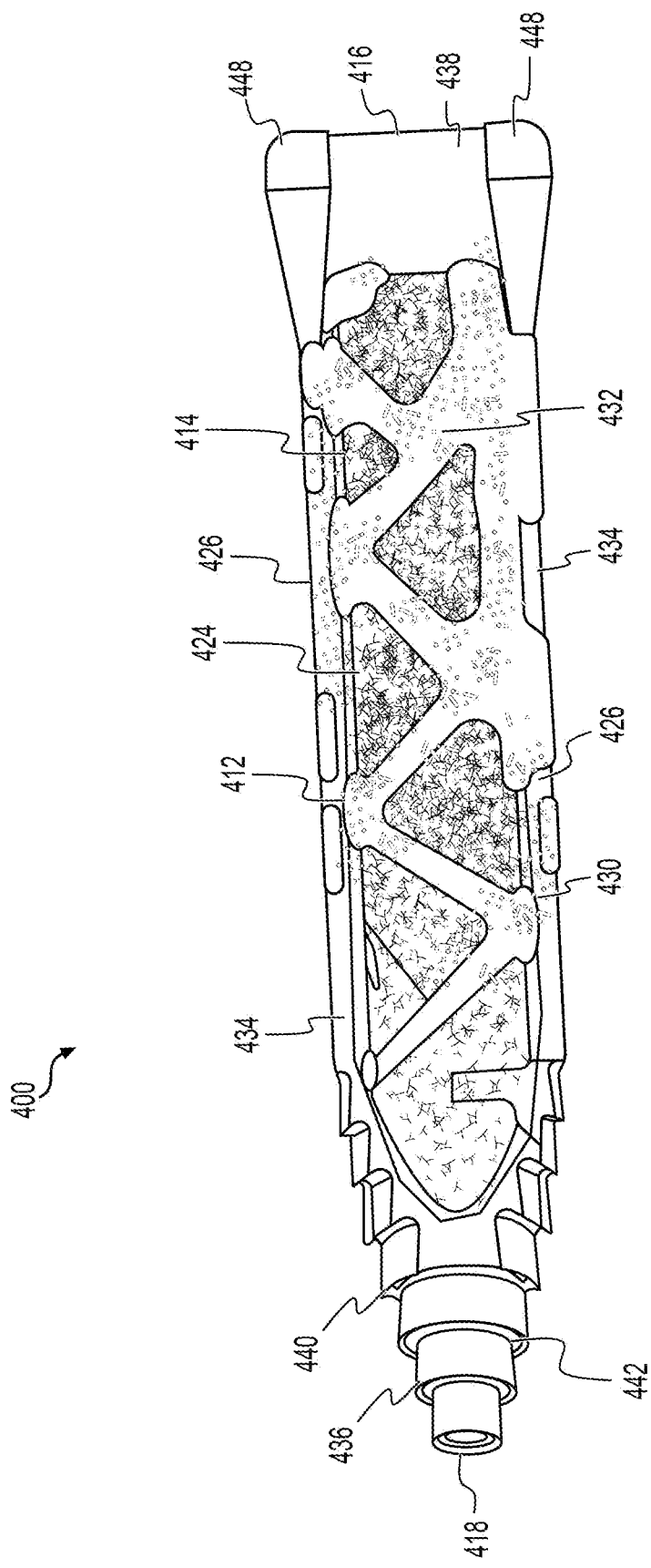

Turning now to FIGS. 9A-9B, an orthopedic fixation device, triangular dowel, or triangular implant 400 is shown according to one embodiment. Implant 400 includes a structural core 412 filled with lattice 414. The skeleton of the structural core 412 may be determined from computational analysis to predict the implant's behavior under load and boundary conditions. The surrounding lattice 414 helps to promote bony growth and improve bone interface strength. The implant 400 extends from a proximal end 416 to a distal end 418 along a central longitudinal axis 420. The distal end 418 may have a self-broaching tip configured to enter the bone first, and the proximal end 416 may be configured to engage bone or be otherwise secured to a rod construct. The implant 400 may be precisely inserted into bone to limit the rotational range of motion and prophylactically fuse the sacroiliac joint.

The implant 400 may define a polygonal outer shape, such as a three-sided polygon having a triangular cross-section. The implant 400 may have a general triangular prism shape including three outer surfaces or faces 424 and three angled corners or vertices 426. The outer surfaces or faces 424 may be generally composed of the lattice structure 414. The vertices 426 may be pointed or sharpened to facilitate insertion. In one embodiment, the outer periphery of the implant 400 is an equilateral triangle with three equal planar faces 424 and three equal vertices 426 of the same angle. The outer triangular shape of the implant 400 is configured to provide rotational and axial fixation in the bone. The structural core 412 may define a central cannulation 444 along the central longitudinal axis 420 between the proximal and distal ends 416, 418. The central cannulation 444 may include a generally cylindrical bore extending through the body of the core 412, for example, for guiding the implant 400 over a guide wire or k-wire.

Figure 10A:
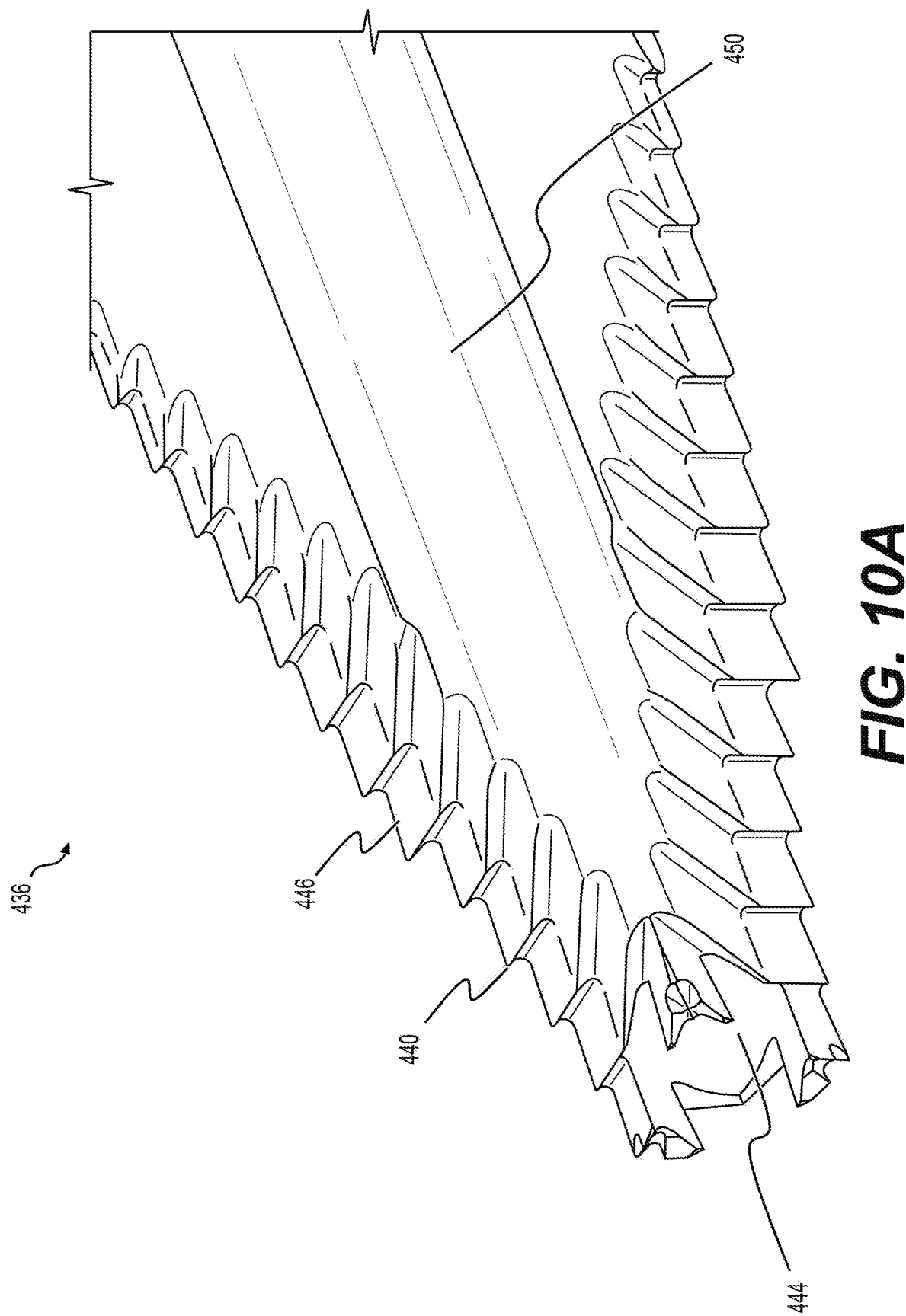
FIGS. 10A-10B show an alternative self-broaching tip for the triangular sacroiliac implant of FIGS. 9A-9B.
Figure 10B:
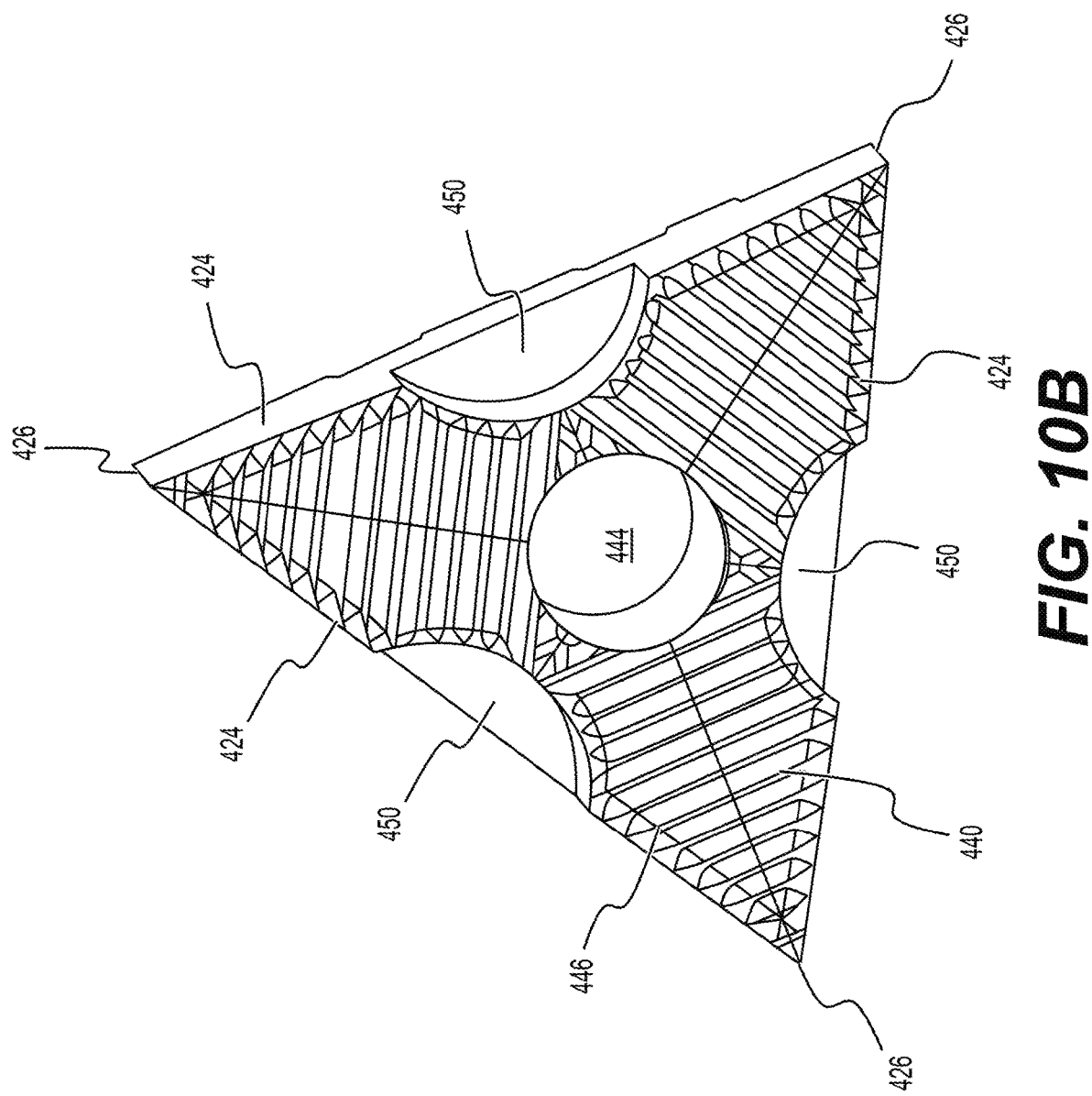

The structural core 412 may include an outer framework 430 and an inner framework 432. The outer framework 430 may include an outer cage with three supports or beams 434 extending between a front end 436 and a rear end 438 of the implant 400. The three supports or beams 434 form the borders or edges of the vertices 426 of the triangle. The beams 434 may include straight strips of material, such as titanium. The front end 436 may include a self-broaching tip with stepped cutting flutes or teeth 440. As best seen in FIG. 9B, the stepped cutting flutes 440 may include concentric rings 442 which step from a small diameter at the distal end 418 to a larger diameter as the rings 442 transition to beams 434 of the outer framework 430. The rings 442 may be truncated as the front end 436 transitions from circular to triangular shapes. In an alternative embodiment shown in FIGS. 10A-10B, the stepped cutting flutes 440 may include divergent flat cutting steps 446 with flutes on the flat sides. The divergent flat cutting steps 446 may be bifurcated to fan out and/or angle away from one another. The fluted areas 440 may be separated from one another by longitudinal channels or grooves 450 that run parallel to the length of the implant 400. The grooves 450 may define smooth rounded or curved recesses configured to guide the bony material during insertion. In each tip configuration, the self-broaching and/or self-harvesting functionality minimizes surface area for implantation while providing additional surface area for bony on-growth. The stepped cutting flutes 440 may further help to promote fusion and reduce operative time.

The rear end 438 of the implant 400 may have a thickened triangular shape with each vertex connected to the respective beams 434. The proximal end 416 may also include one or more fins 448. For example, a pair of fins 448 may be located on each face 424 and along the vertices 426 of the implant 400, thereby increasing the profile of the implant 400 at its proximal end 416. Each fin 448 may have an angular shape with an enlarged proximal end. Each fin 448 may narrow in width and thickness as it extends distally seamlessly integrating into the beams 434. The fins 448 may provide a tactile response to the surgeon, acting as additional resistance when the implant 400 is nearing the end of the implantation process. The fins 448 may also help to reduce the likelihood of implanting past the cortical section of bone, thereby contributing to enhanced surgical precision.

The inner framework 432 may include an irregular, non-uniform, non-structured, or amorphous solid structure, which was previously simulated or modeled by computational analysis, for example, using finite element analysis (FEA). The inner framework 432 may be a single body that has been 3D printed with a symmetric structural framework generated through topography optimization software based on anatomical loading conditions. In some instances, the inner framework 432 may mimic angled struts extending between the opposite beams 434, which define irregular openings 433 therebetween. The irregular openings 433 may resemble triangular shapes but may be non-uniform in size or shape. The generative framework 432 may be complemented by overlapping lattice framework 414 that intentionally does not completely fill the void within the volume containing the generative framework 434. The area of lattice 414 near the distal end 418 may have a greater or more open porosity than the area of lattice 414 near the proximal end 416 of the implant 400. In this manner, the self-harvesting tip 436 is able to channel more bony material into the central region of the implant without encountering obstructions. The lattice framework's non-uniform density may be configured to support and enhance the self-harvesting tip's functionality. The implant 400 combines broaching with implant insertion, streamlining operative procedures, and leveraging the force of implantation to self-harvest and pack internal channels, thereby promoting fusion.

Figure 11:
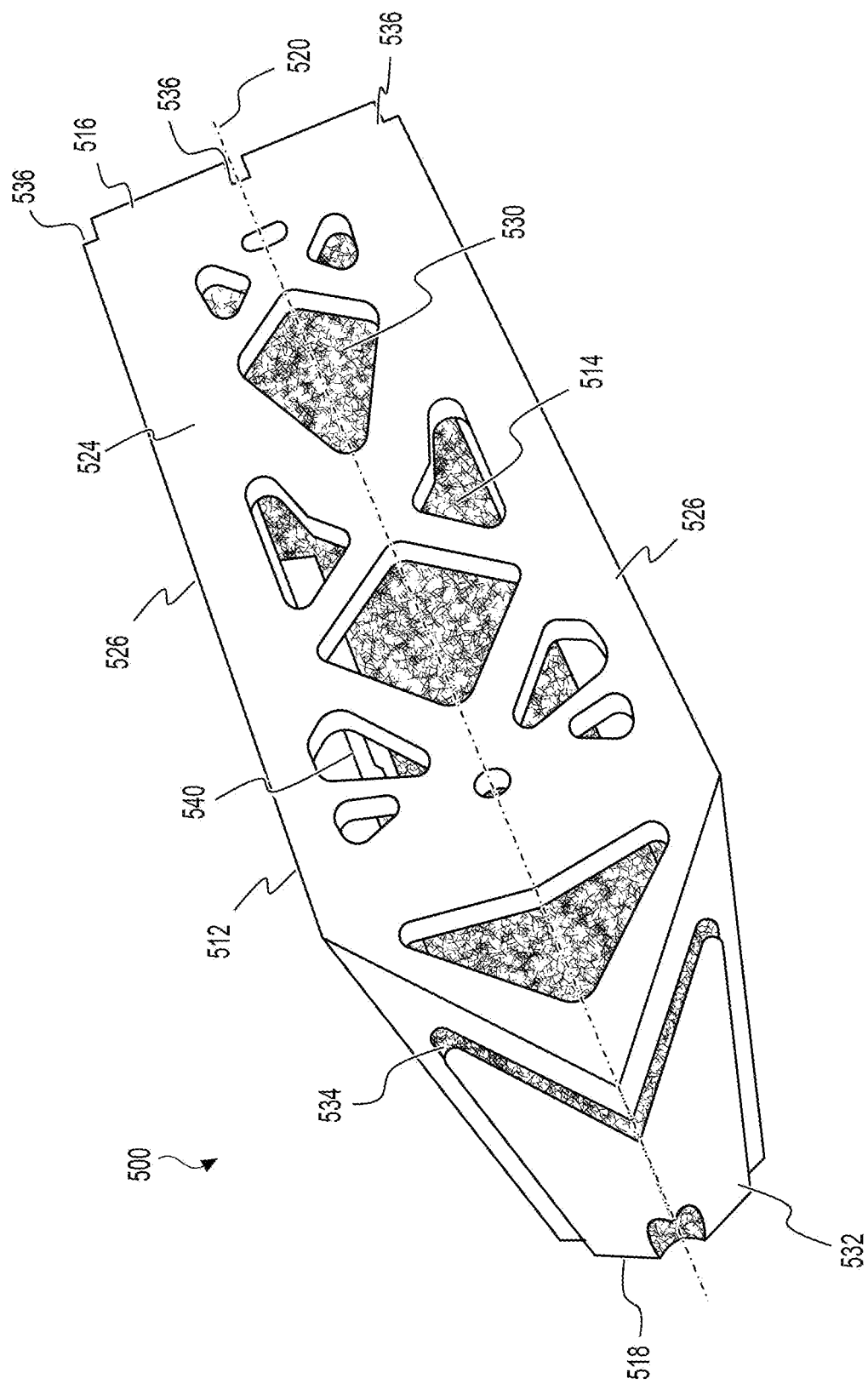
FIG. 11 shows a perspective view of a triangular sacroiliac implant with an outer shell filled with an inner lattice structure having a spring latch configured to secure the lattice to the outer shell according to one embodiment.

Turning now to FIG. 11, an orthopedic fixation device, triangular dowel, or triangular implant 500 is shown according to one embodiment. Unlike previous implants having an inner core, implant 500 has an outer cage or shell 512 filled with lattice 514. The assembly 500 may include outer shell 512 with windows 530 created by generative topology optimization and internal 3D printed lattice 514 inserted into the shell 512. The inner lattice 514 may be secured to the outer shell 512 with a spring latch 540 or other suitable connector. The implant 500 may be 3D printed as a single body. Alternatively, the implant 500 may have a hybrid structure where the lattice body 514 is 3D printed and the outer shell 512 is machined or 3D printed separately. Then, the inner lattice body 514 may be assembly to the outer shell 512, for example, via spring latch 540. The implant 500 extends from a proximal end 516 to a distal end 518 along a central longitudinal axis 520. The distal end 518 may have a removable tip 532 configured to enter the bone first, and the proximal end 516 may be configured to engage bone or be otherwise secured to a rod construct. The implant 500 may be precisely inserted into bone to limit the rotational range of motion and prophylactically fuse the sacroiliac joint.

Similar to the other implants described herein, the implant 500 may define a polygonal outer shape, such as a three-sided polygon having a triangular cross-section. The outer shell 512 may have a general triangular prism shape including three outer surfaces or faces 524 and three angled corners or vertices 526. The vertices 426 may be pointed or sharpened to facilitate insertion. In one embodiment, the outer periphery of the shell 512 is an equilateral triangle with three equal planar faces 524 and three equal vertices 526 of the same angle. The outer triangular shape of the implant 500 is configured to provide rotational and axial fixation in the bone.

The outer shell 512 may include solid walls with windows 530 defined therethrough. The outer shell 512 may include a series of windows 530 defined into each face 524 of the implant 500. The layout of windows 530 may be based on previously simulated or modeled computational analysis, for example, using finite element analysis (FEA). The outer shell 512 may define non-uniform windows 530 including irregularly shaped holes of various sizes and shapes. The size, shape, placement, and spacing of the windows 530 may be optimized to maximize structural integrity while reducing the size or amount of material used in the construction of the shell 512 based on load cases expected. The outer shell 512 may be a single body that has been 3D printed or machined using conventional manufacturing. Each implant length may have its own unique outer shell 312 to maximize strength and open volume.

The distal end 518 of the outer shell 512 may include a removable tip 532. The tip 532 may form a triangular tip with a tapered design that narrows toward the distal end 518. The tip 532 may fit in corresponding opening 534 sized and dimensioned to receive the tip 532. When the tip 532 is removed as shown in FIG. 12B, the inner lattice 514 may be inserted into the front of the outer shell 512. This mitigates the risk of postoperative disassembly and eliminates the need to remove mating material on the proximal end 516, which is used for engagement with an implant holder. Once assembled, the tip 532 may be secured to the distal end 518 of the outer shell 512. The proximal end 516 of the outer shell 512 may include one or more notches 536. For example, angular notches 536 may be positioned along the central longitudinal axis 520 and at the corners of each face 524 at the proximal-most end 516. These notches 536 may be configured to interface with an implant holder or insertion instrument, for example.

Figure 12A:
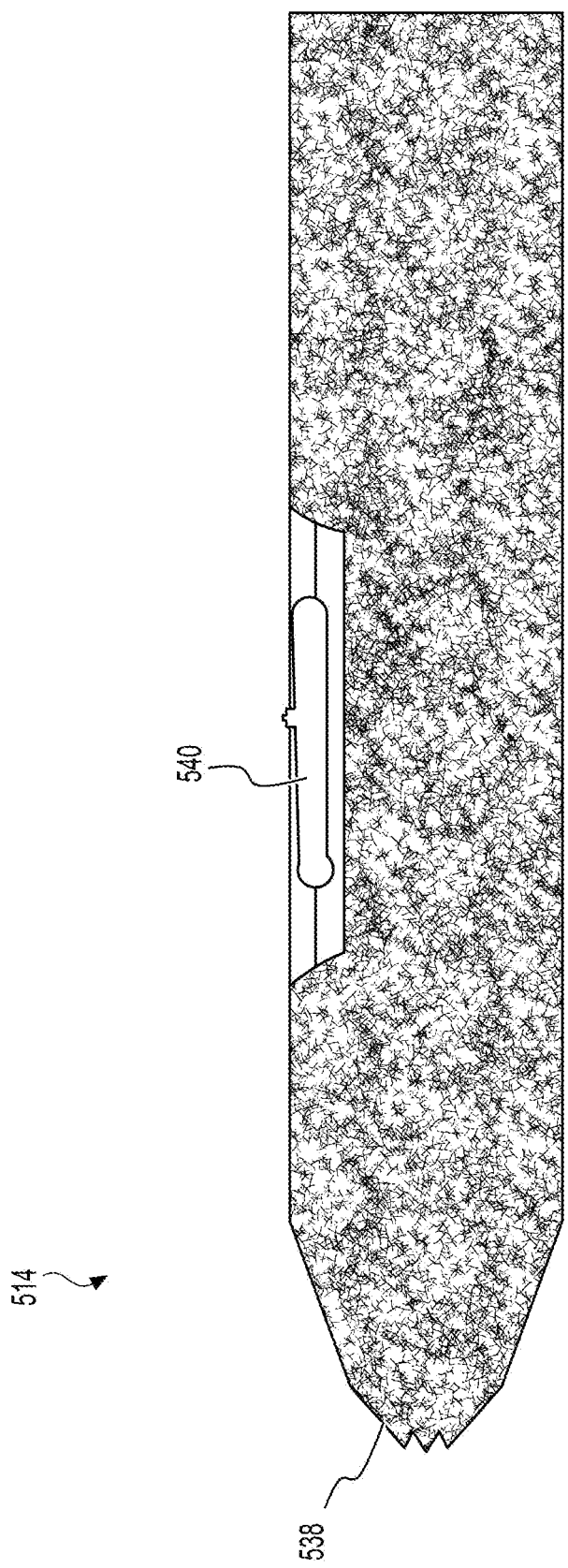
FIGS. 12A-12B show the inner lattice structure with the spring latch, and the outer shell filled with the lattice structure with the tip omitted, respectively.
Figure 12B:
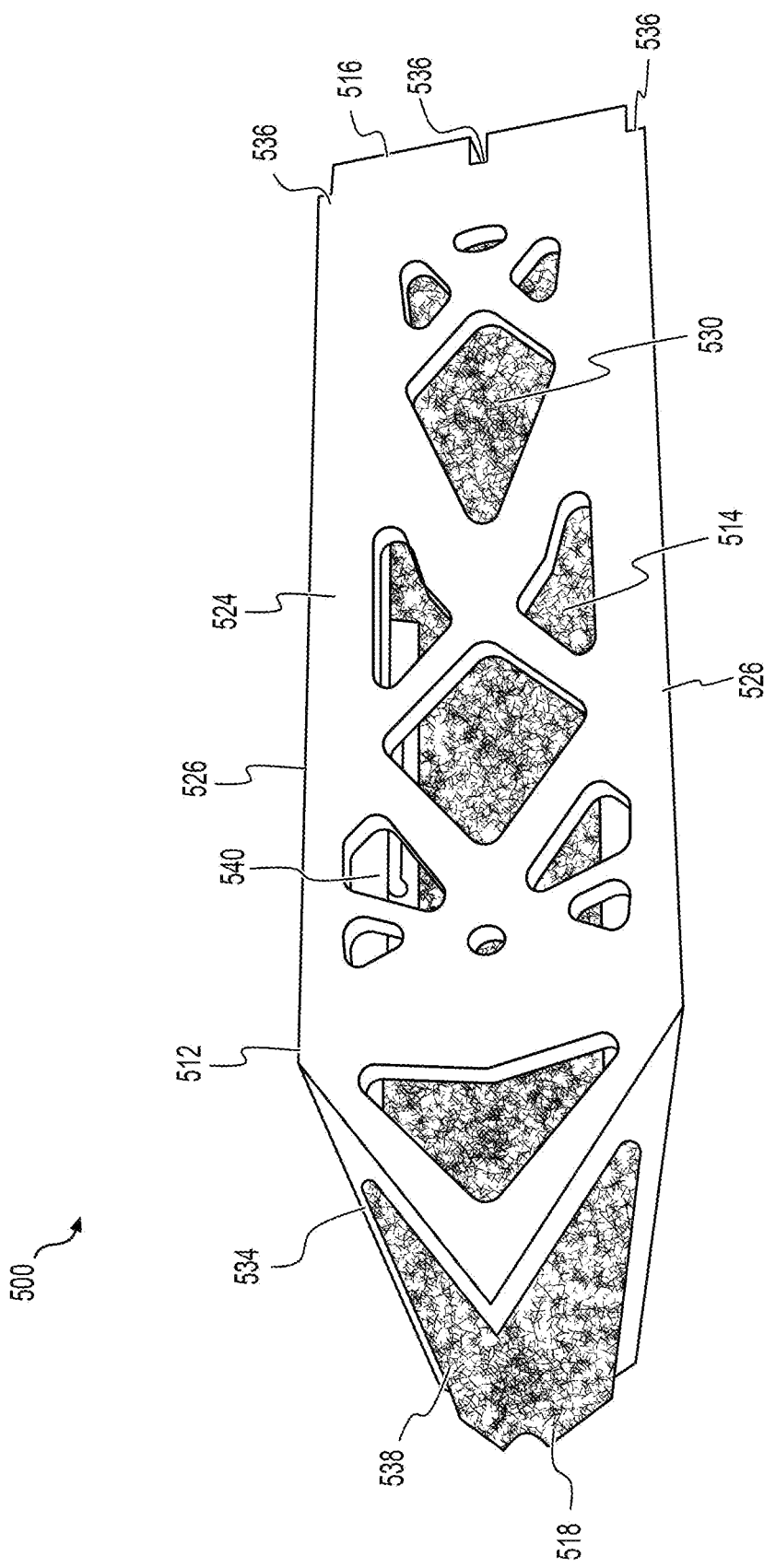

As best seen in FIG. 12A, the inner lattice 514 may include a lattice body or block sized and dimensioned to fit within the outer shell 512. The lattice body 514 may have a tapered or narrowed nose 538 to fit in the tip 532 of the outer shell 512. As described for the other embodiments, the lattice structure 514 may include a uniform or non-uniform 3D printed lattice, which acts as a scaffold for bone healing and bone interdigitation.

Figure 13A:
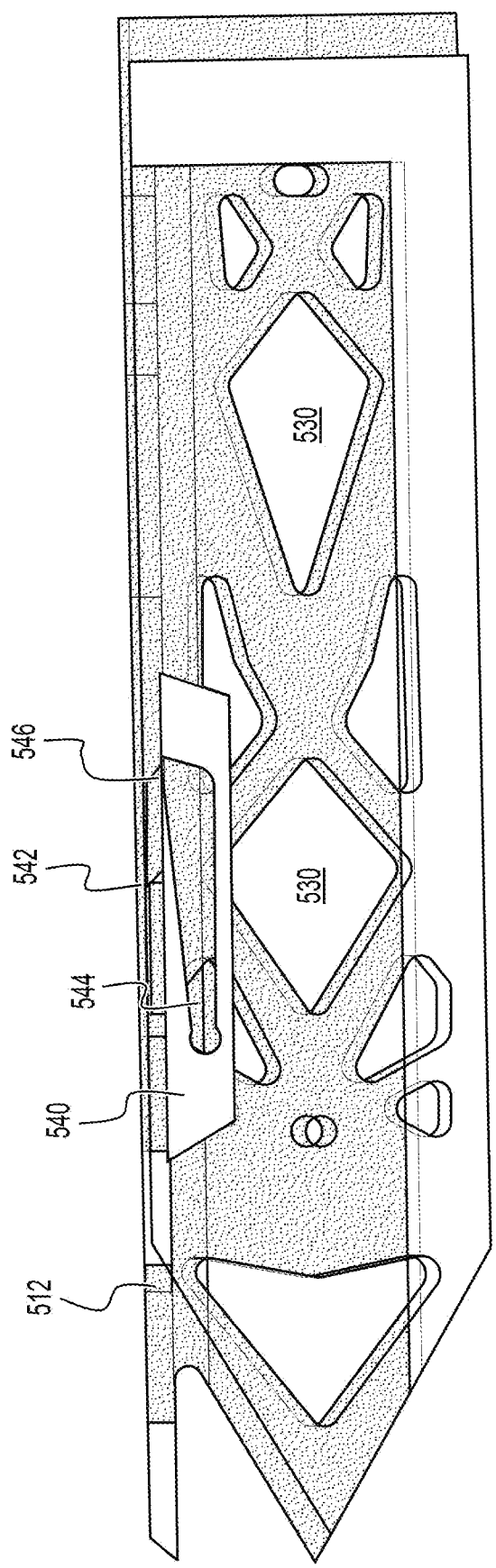
FIGS. 13A-13B show cross-sectional views of the spring latch secured to the outer shell, without and with lattice shown, respectively, according to one embodiment.
Figure 13B:
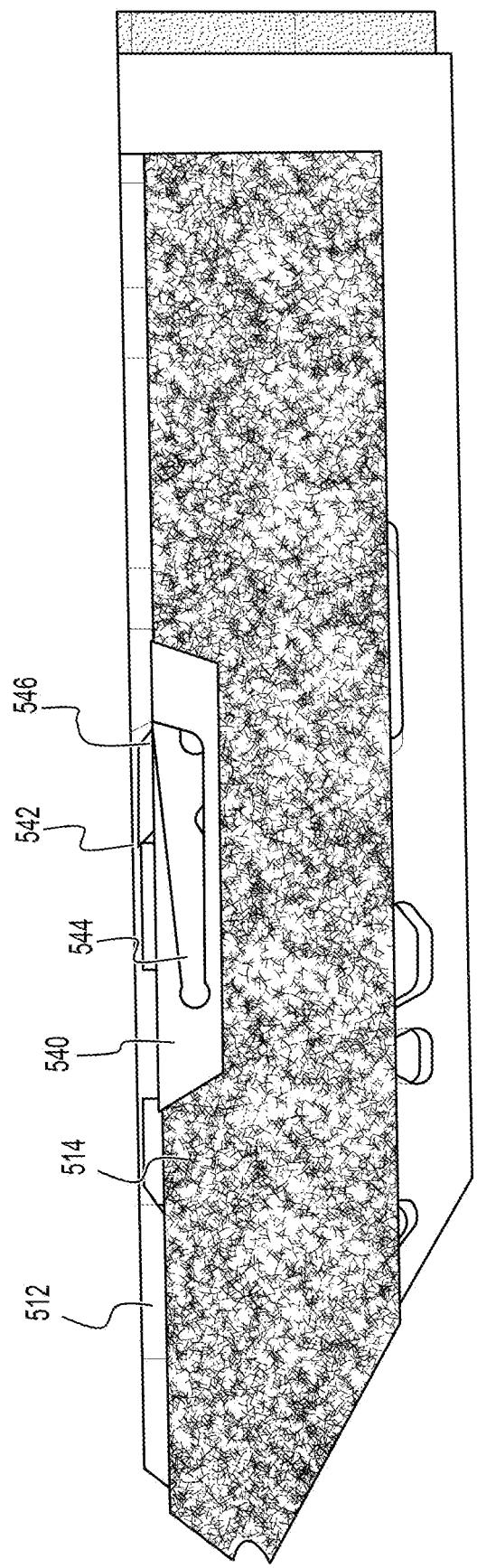

The inner lattice 514 may include a spring latch mechanism 540 configured to secure the inner lattice 514 in the outer shell 512. The spring latch 540 is configured to fit snugly into one of the open sections on the outer shell 512. The spring latch 540 may be located on an outside portion of the lattice 514. As best seen in FIGS. 13A-13B, the spring latch 540 may include a spring tab 542 defined by a spring cut 544. The spring cut 544 defines the size, shape, and degree of flexibility of the tab 542. The spring cut 544 partially surrounds the tab 542 isolating it on three sides while leaving the tab 542 attached to the main body. The free end 546 of the tab 542 can flex or move outward acting like a spring. When inserted into the outer shell 512, the free end 546 of spring latch 540 engages a corresponding opening 540 in the outer shell 512, thereby securing the inner lattice 514 to the outer shell 512. The spring latch 540 is configured to avoid protrusion to the perimeter of the assembly, thereby preventing inadvertent depression of the latch 540. The spring latch 540 ensures a secure and reliable mating interface between the outer shell 512 and the inner lattice 514, contributing to the overall stability and safety of the implant 500. Although a spring latch 540 is exemplified in this embodiment, it will be appreciated that other suitable securing mechanism may be used to retain the inner lattice 514 in the outer shell 512.

Some of the implants described herein may combine the clinical benefit of limiting the rotational range of motion, while being able to provide fixation and precise insertion methods of the implant. Some of the implant structures may be generated through topology optimization software based on anatomical loading conditions to maximize potential fusion area without compromising structural strength. The implants may include lattice structures to promote bony on-growth and through-growth. The hybrid and 3D printed assemblies may provide structural integrity with optimized space for the lattice framework to increase bone interface strength. The implants may include various tip styles, such as trocar tips, self-broaching tips, and self-harvesting tips to reduce operative time.

A method for stabilizing a sacroiliac joint may include (a) providing one or more implants of types described herein; (b) accessing an ilium and/or a sacrum of a patient through a lateral approach or a posterior approach (e.g., lateral to medial or medial to lateral); and (c) inserting the implant across the sacroiliac joint, thereby providing fixation and promoting fusion of the two bones. Multiple implants may be inserted across the joint to better stabilize and prevent movement of the sacroiliac joint. The anatomy of the patient may be accessed using a standard or minimally invasive surgical (MIS) technique. The surgery may be performed with the assistance of robotic and/or navigational systems.

In some embodiments, interchangeable components and/or instrumentation may be provided. This may help to reduce the number of sets required in the operating room and to streamline the technique. Using instrumentation across platforms further reduces the manufacturing burden by reducing the number of new instruments required.

It will be further understood that various changes in the details, materials, and arrangements of the parts which have been described and illustrated in order to explain the nature of this invention may be made by those skilled in the art without departing from the scope of the invention as expressed in the claims. One skilled in the art will appreciate that the embodiments discussed above are non-limiting. It will also be appreciated that one or more features of one embodiment may be partially or fully incorporated into one or more other embodiments described herein.

What is claimed is:

1. An implant comprising:
   a dowel extending along a central longitudinal axis having a distal tip configured to facilitate insertion into bone and a proximal end configured to be engaged by an instrument, the dowel having a triangular cross-section with three faces and three vertices configured to limit rotational motion about the central longitudinal axis,
   wherein the dowel includes a solid portion for providing structural integrity and a lattice portion for facilitating bone growth, wherein the solid portion includes an amorphous geometry optimized based on anatomical loading conditions for the implant,
   wherein the solid portion includes an inner core, and
   wherein the inner core includes an outer framework with three beams forming the three vertices of the dowel and an inner framework having the amorphous geometry.

2. The implant of claim 1, wherein the amorphous geometry for the solid portion is developed by finite element analysis.

3. The implant of claim 1, wherein the amorphous geometry defines a plurality of irregular openings that vary in sizes.

4. The implant of claim 3, wherein the lattice portion surrounds the inner framework and fills in the irregular openings.

5. The implant of claim 1, wherein the distal tip is a self-broaching tip with stepped cutting flutes in the form of concentric rings.

6. The implant of claim 1, wherein the solid portion includes an outer shell.

7. The implant of claim 6, wherein the outer shell includes solid walls with non-uniform windows.

8. The implant of claim 6, wherein the lattice portion is a block sized and dimensioned to fit within the outer shell.

9. The implant of claim 8, wherein the lattice portion is securable to the outer shell with a spring latch.

10. An implant comprising:
    a structural core extending along a central longitudinal axis having a tapered nose configured to facilitate insertion into bone and a proximal end configured to be engaged by an instrument, the structural core having three fins extending outward from the central longitudinal axis; and
    three outer insert trays receivable within respective channels defined between adjacent fins of the three fins of the structural core, thereby forming a triangular outer shape for the implant,
    wherein each outer insert tray and the adjacent fins of the three fins that receive the insert tray are coplanar.

11. The implant of claim 10, wherein the fins are oriented at 120-degree intervals from each other.

12. The implant of claim 10, wherein each fin has a base portion with tapered planar sides and a tip portion with a triangular tip.

13. The implant of claim 12, wherein each insert tray includes a multi-faceted inner surface configured to fit against the base portions of the fins.

14. The implant of claim 10, wherein each insert tray includes an outer surface defining a lattice structure.

15. The implant of claim 14, wherein the lattice structure includes a porous scaffold configured to promote bone growth surrounded by a rim.

16. A method for stabilizing a sacroiliac joint, the method comprising:
    providing an implant having a triangular cross-section with three faces and three vertices, wherein the implant includes a solid portion for providing structural integrity and a lattice portion for facilitating bone growth, wherein a distal end of the implant includes a self-broaching tip with stepped cutting flutes in the form of concentric rings;
    accessing an ilium of a patient; and
    inserting the implant across the sacroiliac joint such that once the implant is fully seated, the implant prevents rotational motion of the implant.

17. The method of claim 16 further comprising inserting multiple implants across the sacroiliac joint to better stabilize and prevent movement of the joint.

18. The method of claim 16 further comprising accessing the sacroiliac joint with a robotic and navigational system.

* * * * *